(12) United States Patent
Al-Sharieh et al.

(10) Patent No.: US 12,504,871 B2
(45) Date of Patent: Dec. 23, 2025

(54) SYSTEMS, METHODS, AND USER INTERFACES FOR GENERATING CUSTOMIZED PROPERTY LANDING PAGE

(71) Applicant: Giraffe360 Limited, London (GB)

(72) Inventors: Ryan Al-Sharieh, Wichita, KS (US); Lauris Bricis, Plavinas (LV); Endija Bierande, Riga (LV)

(73) Assignee: Giraffe360 Limited, London (GB)

( * ) Notice: Subject to any disclaimer, the term of this patent is extended or adjusted under 35 U.S.C. 154(b) by 0 days.

(21) Appl. No.: 18/082,297

(22) Filed: Dec. 15, 2022

(65) Prior Publication Data

US 2023/0384924 A1 Nov. 30, 2023

Related U.S. Application Data

(60) Provisional application No. 63/346,542, filed on May 27, 2022.

(51) Int. Cl.
| | |
|---|---|
| G06Q 50/16 | (2024.01) |
| G06F 3/0482 | (2013.01) |
| G06F 3/04847 | (2022.01) |
| G06F 40/186 | (2020.01) |
| G06T 7/73 | (2017.01) |

(52) U.S. Cl.
CPC ........ *G06F 3/04847* (2013.01); *G06F 3/0482* (2013.01); *G06F 40/186* (2020.01); *G06T 7/73* (2017.01); *G06Q 50/16* (2013.01)

(58) Field of Classification Search
CPC ....... G06F 16/29; G06F 16/168; G06F 16/955
See application file for complete search history.

(56) References Cited

U.S. PATENT DOCUMENTS

| | | | |
|---|---|---|---|
| 9,906,514 B1* | 2/2018 | Podemsky | H04L 67/02 |
| 10,430,902 B1* | 10/2019 | Rawat | G06F 16/215 |
| 11,361,421 B1* | 6/2022 | Ulammandakh | G06N 3/08 |
| 2004/0012810 A1* | 1/2004 | Haas | H04L 51/10 |
| | | | 348/E7.086 |

(Continued)

OTHER PUBLICATIONS

Roomsemble: Progressive web application for intuitive property search, by Chris Kottmyer, Kevin Zhao, Zona Kostic, Aleksandar Jevremovic, IEEE https://arxiv.org/abs/2202.07296 (Year: 2022).*

*Primary Examiner* — Ryan F Pitaro

(74) *Attorney, Agent, or Firm* — Finnegan, Henderson, Farabow, Garrett & Dunner, LLP

(57) ABSTRACT

The present disclosure relates generally to systems and methods for automatic placement of components within a landing page without direct user intervention. In one embodiment, a method may include receiving an indication that an image capture session associated with a property has been completed; accessing at least one image representing a view within the property, the at least one image being captured by an agent using an image capture device during the image capture session; determining a location of the property; generating data for displaying a landing page associated with the property, the landing page indicating the location of the property and including an interface for viewing the at least one image, the data for displaying the landing page being generated independent of a request from the agent; and making the data for displaying a landing page available such that the landing page may be viewed by a user.

19 Claims, 13 Drawing Sheets

(56) References Cited

U.S. PATENT DOCUMENTS

| | | | |
|---|---|---|---|
| 2006/0246918 A1* | 11/2006 | Fok | G01S 5/0009 |
| | | | 455/456.1 |
| 2007/0136255 A1* | 6/2007 | Rizzo | G06F 16/958 |
| 2007/0156660 A1* | 7/2007 | Moricz | G06F 16/951 |
| 2009/0319517 A1* | 12/2009 | Guha | G06F 16/951 |
| | | | 707/999.005 |
| 2010/0042635 A1* | 2/2010 | Venkataramanujam | |
| | | | G06F 16/958 |
| | | | 715/234 |
| 2011/0167077 A1* | 7/2011 | Govani | G06F 16/9537 |
| | | | 707/E17.108 |
| 2014/0019302 A1* | 1/2014 | Meadow | G06Q 30/0623 |
| | | | 705/26.61 |
| 2014/0025657 A1* | 1/2014 | Dorfman | G06F 16/9537 |
| | | | 707/711 |
| 2017/0206648 A1* | 7/2017 | Marra | G01C 21/20 |
| 2019/0243860 A1* | 8/2019 | Kotas | G06F 16/958 |
| 2021/0349955 A1* | 11/2021 | Megill | G06F 16/955 |
| 2022/0374646 A1* | 11/2022 | Ulammandakh | G06N 20/00 |
| 2023/0177808 A1* | 6/2023 | Kappagantula | G06N 3/045 |
| | | | 382/157 |

\* cited by examiner

FIG. 10

SYSTEMS, METHODS, AND USER INTERFACES FOR GENERATING CUSTOMIZED PROPERTY LANDING PAGE

CROSS REFERENCE TO RELATED APPLICATION

This application claims the benefit of priority of U.S. Provisional Application No. 63/346,542, filed May 27, 2022. The foregoing application is incorporated herein by reference in its entirety.

BACKGROUND

Technical Field

The present disclosure relates generally to the capture, analysis, and management of data associated with a property. More specifically, the present disclosure relates to systems, methods, devices, and user interfaces for generating customizable landing pages for properties.

Background Information

In today's real estate market, it is often desirable for agents or other real estate professionals to maintain a robust online presence. For example, many agents maintain webpages displaying available properties, social media accounts, or various other online sites, portals, or pages. Developing and maintaining these pages, however, can be prohibitively burdensome. For example, many agents lack the expertise or time to develop these webpages on their own. Further, due to the nature of the industry, these pages must be continuously updated, which can be demanding and requires agents to spend time away from their other tasks. While some third-party companies offer services for creating, hosting, and maintaining webpages (e.g., single property websites), these services are often expensive and still require significant input from the agents. Further, pages developed by third-party web developers often do not integrate well with other real estate-centric tools agents may use. For example, many platforms or tools that allow agents to create virtual walkthrough of a property make this content difficult to access and port to other webpages. Agents must instead pull this content manually and upload it to a separate webpage, which can be difficult and time consuming.

Accordingly, in view of these and other deficiencies in current techniques, technical solutions are needed to provide a dashboard for generating customizable landing pages for properties. The disclosed solutions are aimed to provide templates for automatically generating a landing page for a particular property. These landing pages may include content generated by the system for a particular property, such as photos, virtual walkthroughs, or other content.

SUMMARY

Embodiments consistent with the present disclosure provide systems and methods for automatic and customizable placement of content to generate a landing page without direct user intervention.

In an embodiment, a computer-implemented method for automatic placement of components within a landing page without direct user intervention may include receiving an indication that an image capture session associated with a property has been completed; accessing at least one image representing a view within the property, the at least one image being captured by an agent using an image capture device during the image capture session; determining a location of the property; generating data for displaying a landing page associated with the property, the landing page indicating the location of the property and including an interface for viewing the at least one image, the data for displaying the landing page being generated independent of a request from the agent; and making the data for displaying a landing page available such that the landing page may be viewed by a user.

In an embodiment, a system for automatic placement of components within a landing page without direct user intervention may include at least one processor. The at least one processor may be configured to receive an indication that an image capture session associated with a property has been completed; access at least one image representing a view within the property, the at least one image being captured by an agent using an image capture device during the image capture session; determine a location of the property; generate data for displaying a landing page associated with the property, the landing page indicating the location of the property and including an interface for viewing the at least one image, the data for displaying the landing page being generated independent of a request from the agent; and make the data for displaying a landing page available such that the landing page may be viewed by a user.

Consistent with other disclosed embodiments, non-transitory computer readable storage media may store program instructions, which are executed by at least one processor and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIGS. 9, 10, and 11 illustrate example views of a landing page, consistent with embodiments of the present disclosure.

DETAILED DESCRIPTION

Figure 1:
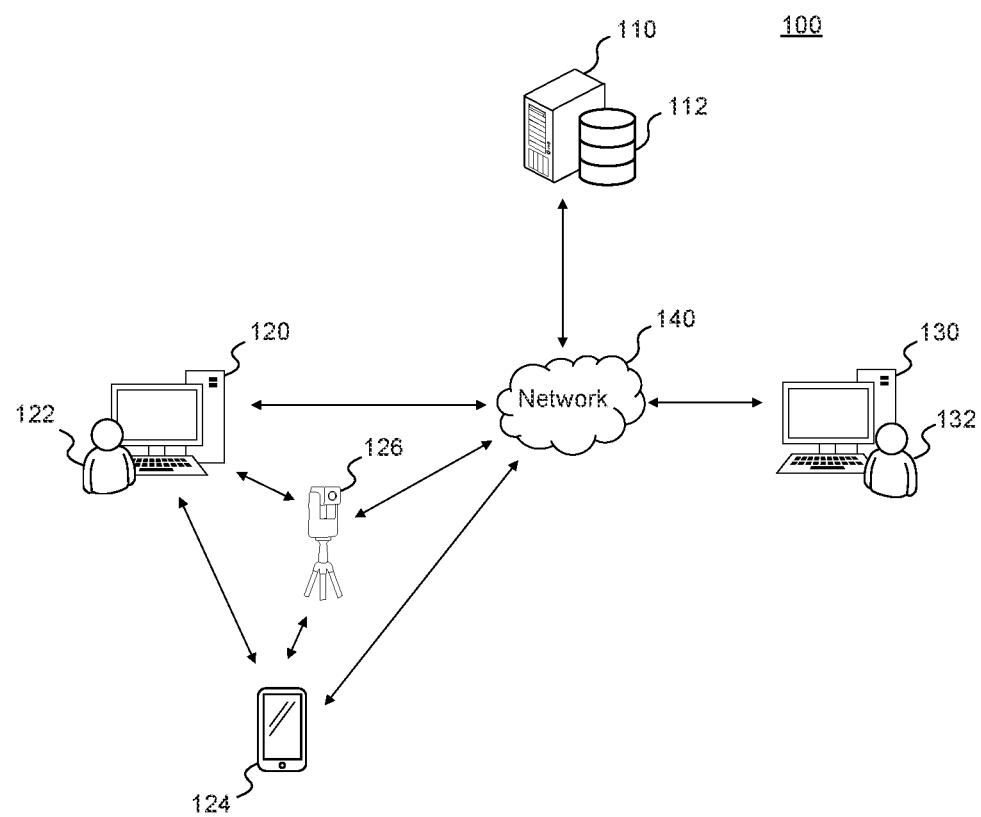
FIG. 1 is a diagrammatic representation of an example system for capturing and managing property data, consistent with embodiments of the present disclosure.

Unless specifically stated otherwise, throughout the specification discussions utilizing terms such as "processing", "calculating", "computing", "determining", "generating", "setting", "configuring", "selecting", "defining", "applying", "obtaining", "monitoring", "providing", "identifying", "segmenting", "classifying", "analyzing", "associating", "extracting", "storing", "receiving", "transmitting", or the like, include actions and/or processes of a computer that manipulate and/or transform data into other data, the data represented as physical quantities, for example such as electronic quantities, and/or the data representing physical objects. The terms "computer", "processor", "controller", "processing unit", "computing unit", and "processing module" should be expansively construed to cover any kind of electronic device, component or unit with data processing capabilities, including, by way of non-limiting example, a personal computer, a wearable computer, smart glasses, a tablet, a smartphone, a server, a computing system, a cloud computing platform, a communication device, a processor (for example, digital signal processor (DSP), an image signal processor (ISR), a microcontroller, a field programmable gate array (FPGA), an application specific integrated circuit (ASIC), a central processing unit (CPA), a graphics processing unit (GPU), a visual processing unit (VPU), and so on), possibly with embedded memory, a single core processor, a multi core processor, a core within a processor, any other electronic computing device, or any combination of the above.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or sequentially.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure employs open-ended permissive language, indicating for example, that some embodiments "may" employ, involve, or include specific features. The use of the term "may" and other open-ended terminology is intended to indicate that although not every embodiment may employ the specific disclosed feature, at least one embodiment employs the specific disclosed feature.

The various embodiments described herein generally relate to the capture, storage, management, analysis, sharing, and presentation of data associated with a property. As used herein, a property may refer to any form of physical asset, and may refer to a piece of land or real estate, which may include one or more buildings or other improvements or enhancements. For example, a property may refer to a residential property (e.g., single family detached home, a single family semi-detached home, a townhome, an apartment, a multi-family residential, mobile homes, etc.), a commercial property (e.g., an office space, a retail space, a hotel room, a mixed-use space, etc.), an industrial property (e.g., manufacturing facilities, warehouses, showrooms, data centers, laboratories, research facilities, etc.), land, or any other type of real estate property. In some embodiments, a property may refer to a vehicle or other form of property that may not necessarily be tied to a specific physical location. For example, a property may refer to a recreational vehicle, such as a motorhome, campervan, coach, camper trailer (e.g., fifth-wheel trailers, popup campers, and truck campers), ships, airplanes, or the like. In some embodiments, a property may include virtual spaces, such as a virtual representation of a building or a space within a virtual setting. While real estate properties are used by way of example throughout the present disclosure, one skilled in the art would recognize that a property may refer to various other objects that may be toured or inspected virtually.

Consistent with embodiments of the present disclosure, data associated with one or more properties may be collected, analyzed, and shared in various ways. In the example of real estate properties, such as homes, apartments, offices, or other buildings, this data may include images captured from within the property. For example, a user, such as a real estate agent, may capture one or more images of the property using an image capture device, as described in further detail below. These images, along with various other forms of data may be uploaded to a server, which may perform various processing operations as described herein. The data (including data having been processed by the server) may then be shared with various other entities or users, such as prospective buyers or renters of the property. The data may be presented in a manner allowing the users to interact with the data and visualize the property.

Systems consistent with some disclosed embodiments may include one or more servers configured to communicate with various computing devices or entities. As used herein, a server may be any form of computing device capable of accessing data through a network and processing the data consistent with embodiments of the present disclosure. In some embodiments, the server may include a single computing device, such as a server rack. In other embodiments, the remote server may include multiple computing devices, such as a server farm or server cluster. The remote server may also include network appliances, mobile servers, cloud-based server platforms, or any other form of central computing platform. Various example remote servers are described in greater detail below.

FIG. 1 is a diagrammatic representation of an example system 100 for capturing and managing property data, consistent with embodiments of the present disclosure. As shown in FIG. 1, system 100 may include a server 110. Server 110 may be any form of one or more computing devices for accessing data, processing data, storing data, and/or transmitting data to various other entities or computing devices. For example, this may include data associated with a property, as described above. A computing device may refer to any structure that includes at least one processor. As used herein, "at least one processor" may constitute any physical device or group of devices having electric circuitry that performs a logic operation on an input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively, and may be co-located or located remotely from each other. The processors may be coupled electrically, magnetically, optically, acoustically, mechanically or by other means that permit them to interact.

In some embodiments, server 110 may access at least one database, such as database 112. As used herein, a "database" may be construed synonymously with a "data structure" and may include any collection or arrangement of data values and relationships among them, regardless of structure. For example, a database may refer to a tangible storage device, e.g., a hard disk, used as a database, or to an intangible storage unit, e.g., an electronic database. As used herein, any data structure may constitute a database. The data contained within a data structure may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures.

In some embodiments, server 110 may communicate with one or more computing devices, such as computing devices 120 or 130. Computing devices 120 and 130 may include any device that may be used for performing conducting various operations associated with a data associated with a property. Accordingly, computing devices 120 or 130 may include various forms of computer-based devices, such as a workstation or personal computer (e.g., a desktop or laptop computer), a mobile device (e.g., a mobile phone or tablet), a wearable device (e.g., a smart watch, smart jewelry, implantable device, fitness tracker, smart clothing, head-mounted display, etc.), an IoT device (e.g., smart home devices, industrial devices, etc.), or any other device that may be capable of receiving, storing, processing, or transmitting data. In some embodiments, computing devices 120 or 130 may be a virtual machine (e.g., based on AWS™, Azure™, IBM Cloud™, etc.), container instance (e.g., Docker™ container, Java™ container, Windows Server™ container, etc.), or other virtualized instance.

In some embodiments, computing device 120 may be associated with a user 122. User 122 may include any entity associated with a property. An entity may refer to any distinct or independent existence. For example, an entity be an individual, a user, a device, an account, an application, a process, a service, a facility, a piece of equipment, an organization, or any other form of object, article or person. Alternatively or additionally, an entity may be a group of two or more components (e.g., individuals, users, devices, accounts, etc.) forming a single entity. In some embodiments, user 122 may be a real estate agent. As used herein, a real estate agent may refer to or include a professional who represents parties in real estate transactions. For example, a real estate agent may include buyers, sellers, renters, landlords, or any other parties that may be involved in a real estate transaction or contract associated with a real estate property. Alternatively or additionally, user 122 may be another entity associated with a property such as a property owner, a landlord, or any other entity that may be associated with a property. User 122 may include various other entities that may capture or upload data associated with a property, such as a photographer, a staging professional, an interior designer, an architect, a landscape designer, or the like. Accordingly, user 122 may use computing device 120 to generate, capture, process, and/or transmit data associated with a property, as described throughout the present disclosure.

In some embodiments, user 122 may be associated with various other devices, such as mobile device 124 and image capture device 126. As with computing device 120, mobile device 124 may include any device that may be used for performing or conducting various operations associated with a data associated with a property. For example, mobile device 124 may be a mobile phone or other mobile device of user 122. Additionally or alternatively, mobile device 124 may include a laptop, a tablet, a wearable device (e.g., a smart watch, smart jewelry, implantable device, fitness tracker, smart clothing, head-mounted display, etc.), or any other device that may be associated with user 122. In some embodiments, mobile device 124 may include a memory device, such as a flash drive, a solid-state drive, a hard drive, or the like. In some embodiments, mobile device 124 may not necessarily be a separate device relative to computing device 120.

Image capture device 126 may be any device capable of capturing one or more images or a property, consistent with embodiments of the present disclosure. For example, image capture device 126 may be a digital camera used by user 122 to capture images of a property, which may then be uploaded to server 110. In some embodiments, image capture device 126 may include a specialized device for capturing images of buildings or other property. For example, image capture device 126 may be a rotating camera device capable of capturing and/or compiling 360-degree images of a space at various locations within a property. In some embodiments, image capture device 126 may include multiple image sensors or may include various other sensors, such as light sensors, light detection and ranging (LIDAR) sensors, radio detection and ranging (RADAR) sensors, accelerometers, global positioning system (GPS) sensors, or the like.

Computing device 130 may be similar to computing device 120 but may be remotely located relative to a property. For example, computing device 130 may be used to access data associated with a property, but may not be directly involved with the capture or upload of the data. In some embodiments, computing device 130 may be associated with a user 132, which may be a different user from user 122. In some embodiments, user 132 may use computing device 130 to communicate with computing device 120 and/or server 110, which may include accessing and interacting with data associated with the property. For example, user 132 may be a prospective buyer or renter of the property and may use computing device 130 to tour a property virtually or otherwise access data associated with the property. In some embodiments, user 132 may be referred to as an "end user" of system 100. In example embodiments where user 122 is a real estate agent, user 132 may be a client of user 122 and may access data associated with a property as part of his or her representation by user 122. Alternatively or additionally, user 122 may be a real estate agent representing a seller, and thus user 132 may not necessarily be represented by user 122. While a prospective buyer or renter is provided by way of example, user 132 may include any other entity that may be interested in viewing or accessing data associated with a property. For example, user 132 may include but is not limited to a property inspector, an appraiser, an engineer, a maintenance or repair professional, a designer, an architect, or any other entity associated with a property.

Consistent with embodiments of the present disclosure, the various components may communicate over a network 140, as shown in FIG. 1. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth®, infrared, etc.), or any other type of network for facilitating communications. In some embodiments, the communications may take place across two or more of these forms of networks and protocols. While system 100 is shown as a network-based environment, it is understood that the disclosed systems and methods may also be used in a localized system, with one or more of the components communicating directly with each other. For example, as shown in FIG. 1, computing device 120, mobile device 124, and image capture device 126 may be configured to communicate directly with each other (e.g., without an intermediate device), which may be in addition to or instead of direct communication with server 110. For example, in some embodiments image capture device 126 may transmit data directly to server 110 over network 140. Alternatively or additionally, image capture device 126 may transmit data over a shorter-range communication path to an intermediate device, such as computing device 120 or mobile device 124, which may transmit the data (either directly or after processing it further) to server 110.

Figure 2:
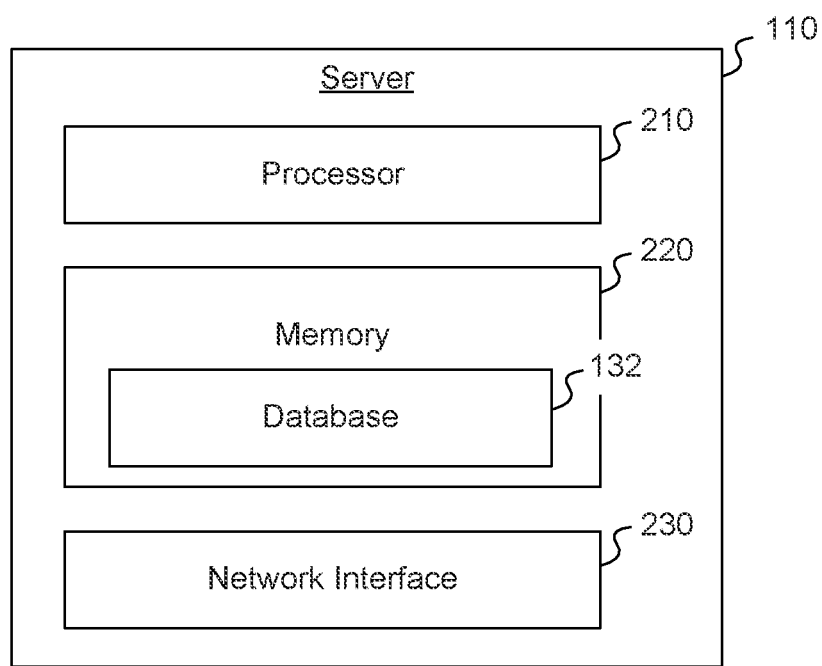
FIG. 2 is a block diagram illustrating an example server, consistent with embodiments of the present disclosure.

FIG. 2 is a block diagram illustrating an example server 110, consistent with embodiments of the present disclosure. As described above, server 110 may be a computing device and may include one or more dedicated processors and/or memories. For example, server 110 may include at least one processor, more generally referred to as processor 210, a memory (or multiple memories) 220, a network interface (or multiple network interfaces) 230, as shown in FIG. 2. As indicated above, in some embodiments, server 110 may be a rack of multiple servers. Accordingly, server 110 may include multiple instances of the example server shown in FIG. 2.

Processor 210 may take the form of, but is not limited to, a microprocessor, embedded processor, or the like, may be integrated in a system on a chip (SoC), or more take the form of any processor described earlier. Furthermore, according to some embodiments, the processor 210 may be from the family of processors manufactured by Intel®, AMD®, Qualcomm®, Apple®, NVIDIA®, or the like. Processor 210 may also be based on an ARM architecture, a mobile processor, or a graphics processing unit, etc. The disclosed embodiments are not limited to any type of processor included in server 110. In some embodiments, processor 210 may refer to multiple processors.

Memory 220 may include one or more storage devices configured to store instructions used by the processor 210 to perform functions related to the disclosed embodiments. Memory 220 may be configured to store software instructions, such as programs, that perform one or more operations when executed by the processor 210 to perform the various functions or methods described herein. The disclosed embodiments are not limited to particular software programs or devices configured to perform dedicated tasks. For example, memory 220 may store a single program, such as a user-level application, that performs the functions of the disclosed embodiments, or may include multiple software programs. Additionally, the processor 210 may in some embodiments execute one or more programs (or portions thereof) remotely located from server 110. Furthermore, the memory 220 may include one or more storage devices configured to store data for use by the programs. In some embodiments, memory 220 may include a local database 112, as described in further detail above.

Network interface 230 may include one or more network adaptors or communication devices and/or interfaces (e.g., WiFi®, Bluetooth®, RFID, NFC, RF, infrared, Ethernet, etc.) to communicate with other machines and devices, such as with other components of system 100 through network 140. For example, server 110 may use a network interface 230 to receive and transmit information associated with a property within system 100.

Figure 3A:
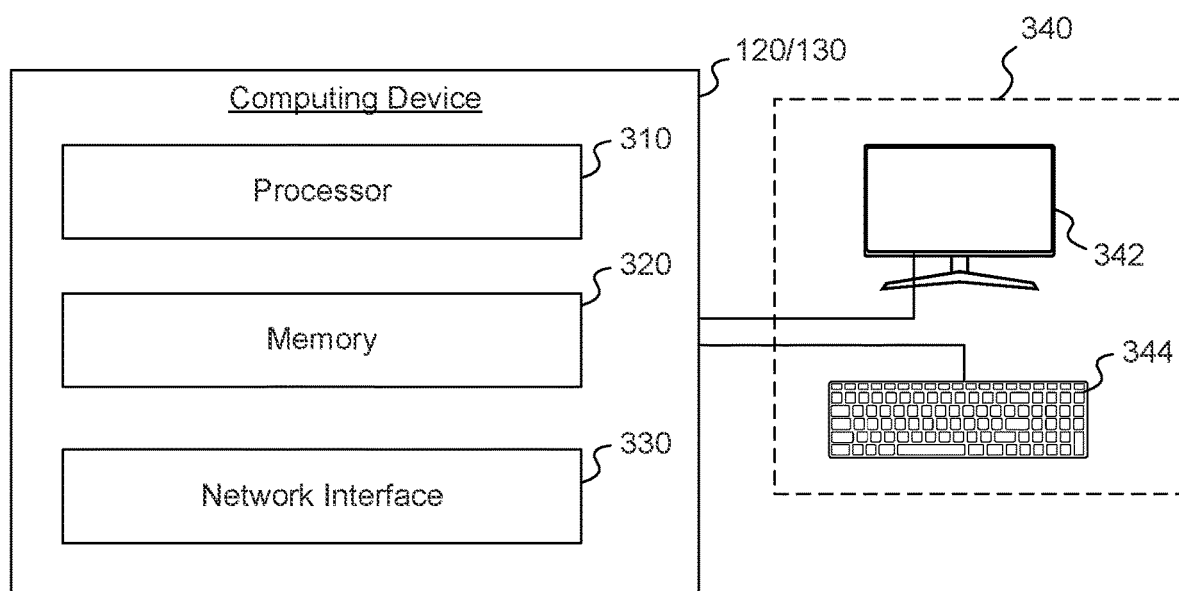
FIG. 3A is a block diagram illustrating an example computing device, consistent with embodiments of the present disclosure.

FIG. 3A is a block diagram illustrating an example computing device, consistent with embodiments of the present disclosure. Computing device 120 (or computing device 130) may include one or more dedicated processors and/or memories, similar to server 110. For example, computing device 120 may include at least one processor 310, a memory (or multiple memories) 320, a network interface (or multiple network interfaces) 330, and/or one or more input/output (I/O) devices 340, as shown in FIG. 3A. Processor 310, memory 320, and network interface 330 may be similar to processor 210, memory 220 and network interface 230, described above. Accordingly, any details, examples, or embodiments described above with respect to processor 210, memory 220 and network interface 230 may equally apply to processor 310, memory 320, and network interface 330.

For example, processor 310 may take the form of, but is not limited to, a microprocessor, embedded processor, or the like, may be integrated in a system on a chip (SoC), or more take the form of any processor described earlier. The disclosed embodiments are not limited to any type of processor included in computing device 120 and processor 310 may refer to multiple processors. Memory 320 may include one or more storage devices configured to store instructions used by the processor 310 to perform functions related to the disclosed embodiments. Memory 320 may be configured to store software instructions, such as programs, that perform one or more operations when executed by the processor 310 to perform the various functions or methods described herein. Network interface 330 may include one or more network adaptors or communication devices and/or interfaces (e.g., WiFi®, Bluetooth®, RFID, NFC, RF, infrared, Ethernet, etc.) to communicate with other machines and devices, such as with other components of system 100 (including server 110) through network 140.

I/O devices 340 may include one or more interface devices for interfacing with a user of server 110. For example, I/O devices 340 may include a display 342 configured to display various information to a user, such as user 122. In some embodiments, display 342 may be configured to present one or more graphical user interfaces to a user and may receive information through the graphical user interface. In some embodiments, I/O devices 340 may include a keyboard 344 or other device through which a user may input information. I/O devices 340 may include various other forms of devices, including but not limited to lights or other indicators, a touchscreen, a keypad, a mouse, a trackball, a touch pad, a stylus, buttons, switches, dials, motion sensors, microphones, video capturing devices, or any other user interface device, configured to allow a user to interact with computing device 120. Although I/O devices 340 are illustrated as external or separate components from computing device 120 by way of example, it is to be understood that computing device 120 may be defined to include I/O devices 340. In some embodiments, I/O devices 340 may be integral to computing device 120. For example, in embodiments where computing device 120 includes a mobile device such as a phone or tablet computer, I/O devices 340 may be integral to computing device 120.

Some disclosed embodiments may include presenting various user interfaces to receive information from a user. For example, this may include displaying one or more graphical user interfaces on display 342 and receiving a user input through keyboard 344 or various other forms of I/O devices. Consistent with the present disclosure, the user inputs may be used to define or provide various information, including but not limited to image data, virtual tour data, landing pages, or various other forms of information described herein.

Figure 3B:
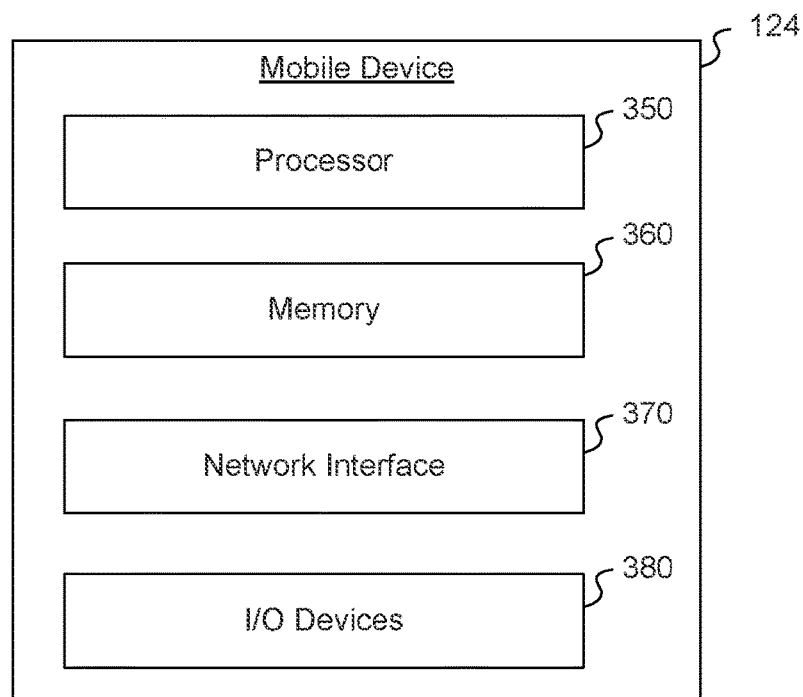
FIG. 3B is a block diagram illustrating an example mobile device, consistent with embodiments of the present disclosure.

FIG. 3B is a block diagram illustrating an example mobile device 124, consistent with embodiments of the present disclosure. Mobile device 124 may include one or more dedicated processors and/or memories, similar to server computing device 120 (or computing device 130). For example, mobile device 124 may include at least one processor 350, a memory (or multiple memories) 360, a network interface (or multiple network interfaces) 370, and/or one or more input/output (I/O) devices 370, as shown in FIG. 3B. Processor 350, memory 360, network interface 370, and I/O devices 380 may be similar to processor 310, memory 320, network interface 330, and I/O devices 340 described above. Accordingly, any details, examples, or embodiments described above with respect to processor 310, memory 320, network interface 330, and I/O devices 340 may equally apply to processor 350, memory 360, network interface 370, and I/O devices 380.

For example, processor 350 may take the form of, but is not limited to, a microprocessor, embedded processor, or the like, may be integrated in a system on a chip (SoC), or more take the form of any processor described earlier. Memory 360 may include one or more storage devices configured to store instructions used by the processor 350 to perform functions related to the disclosed embodiments. Memory 360 may be configured to store software instructions, such as programs, that perform one or more operations when executed by the processor 350 to perform the various functions or methods described herein. Network interface 370 may include one or more network adaptors or communication devices and/or interfaces (e.g., WiFi®, Bluetooth®, RFID, NFC, RF, infrared, Ethernet, etc.) to communicate with other machines and devices, such as with other components of system 100 (including server 110) either directly or through network 140. I/O devices 380 may include one or more interface devices for interfacing with a user of server 110. For example, I/O devices 380 may include a display configured to display various information to a user, such as user 122. I/O devices 380 may include various other forms of devices, including but not limited to lights or other indicators, a touchscreen, a keypad, a mouse, a trackball, a touch pad, a stylus, buttons, switches, dials, motion sensors, microphones, video capturing devices, or any other user interface device, configured to allow a user to interact with computing device 120.

Figure 4:
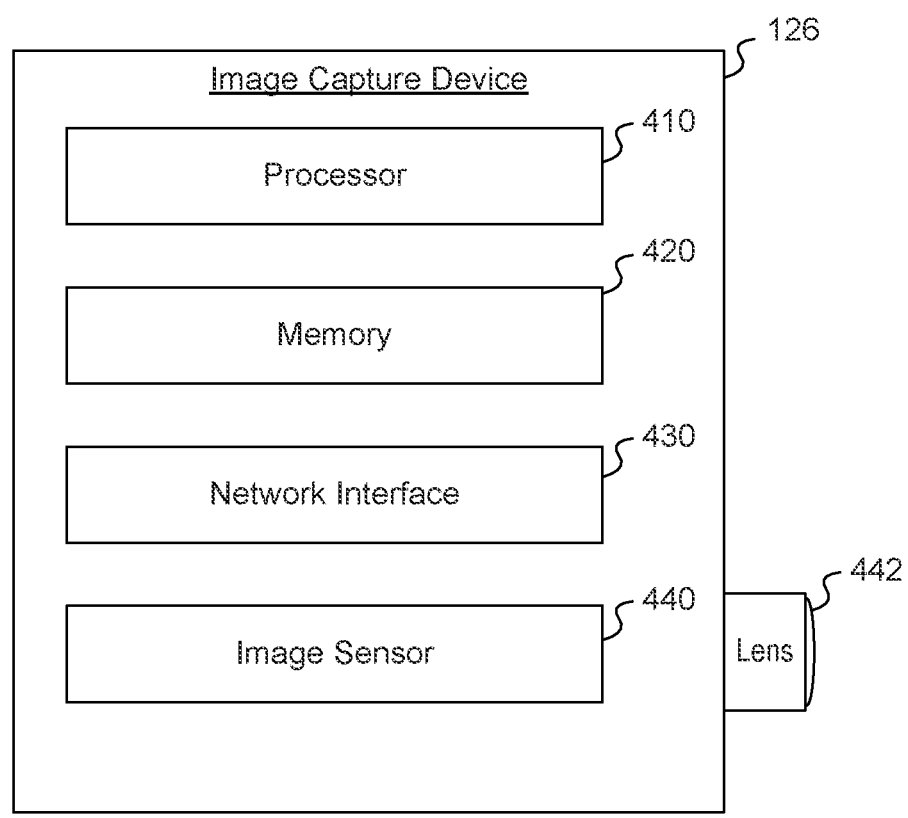
FIG. 4 is a block diagram illustrating an example image capture device, consistent with embodiments of the present disclosure.

FIG. 4 is a block diagram illustrating an example image capture device 126, consistent with embodiments of the present disclosure. Image capture device 126 may include one or more dedicated processors and/or memories, similar to computing devices 120 or 130. For example, image capture device 126 may include at least one processor 410, a memory (or multiple memories) 420, a network interface (or multiple network interfaces) 430, and/or one or more input/output (I/O) devices 340, as shown in FIG. 3A. Processor 410, memory 420, and network interface 430 may be similar to processor 310, memory 320 and network interface 330, described above. Accordingly, any details, examples, or embodiments described above with respect to processor 310, memory 320 and network interface 330 may equally apply to processor 410, memory 420, and network interface 430. For example, processor 410 may take the form of, but is not limited to, a microprocessor, embedded processor, or the like, may be integrated in a system on a chip (SoC), or more take the form of any processor described earlier.

Memory 420 may include one or more storage devices configured to store instructions used by the processor 410 to perform functions related to the disclosed embodiments. Memory 420 may be configured to store software instructions, such as programs, that perform one or more operations when executed by the processor 410 to perform the various functions or methods described herein. Network interface 430 may include one or more network adaptors or communication devices and/or interfaces (e.g., WiFi®, Bluetooth®, RFID, NFC, RF, infrared, Ethernet, etc.) to communicate with other machines and devices, such as with other components of system 100 (including server 110) either directly or through network 140. In some embodiments, image capture device 126 may further include various I/O devices, similar to I/O devices 340 or 380 described above.

As shown in FIG. 4, image capture device 126 may include at least one image sensor 440 associated with at least one lens 442 for capturing image data in an associated field of view. In some configurations, image capture device 126 may include a plurality of image sensors 440 associated with a plurality of lenses 442. In other configurations, image sensor 440 may be part of a camera included in image capture device 126. Consistent with the present disclosure, image capture device 126 may include digital components that collect data from image sensor 440, transform it into an image, and store the image on a memory device 420 and/or transmit the image using network interface 430. In some embodiments, image capture device 126 may be configured to capture images from multiple directions, which may be compiled to generate a panoramic or 360-degree image. In one embodiment, image capture device 126 may be split into at least two housings such that image sensor 440 and lens 442 may be rotatable relative to one or more other components, which may be located in a separate housing. An example of this type of capturing device is described below with reference to FIG. 5. Alternatively or additionally, image capture device 126 may include multiple image sensors 440 and/or lenses 442 which may simultaneously (or near-simultaneously) capture images in multiple directions, which may be compiled into a composite image. The processing of multiple images to form a composite image may occur locally (e.g., using processor 410), or may be performed fully or at least partially by another device such as computing device 120, mobile device 124, or server 110.

Figure 5:
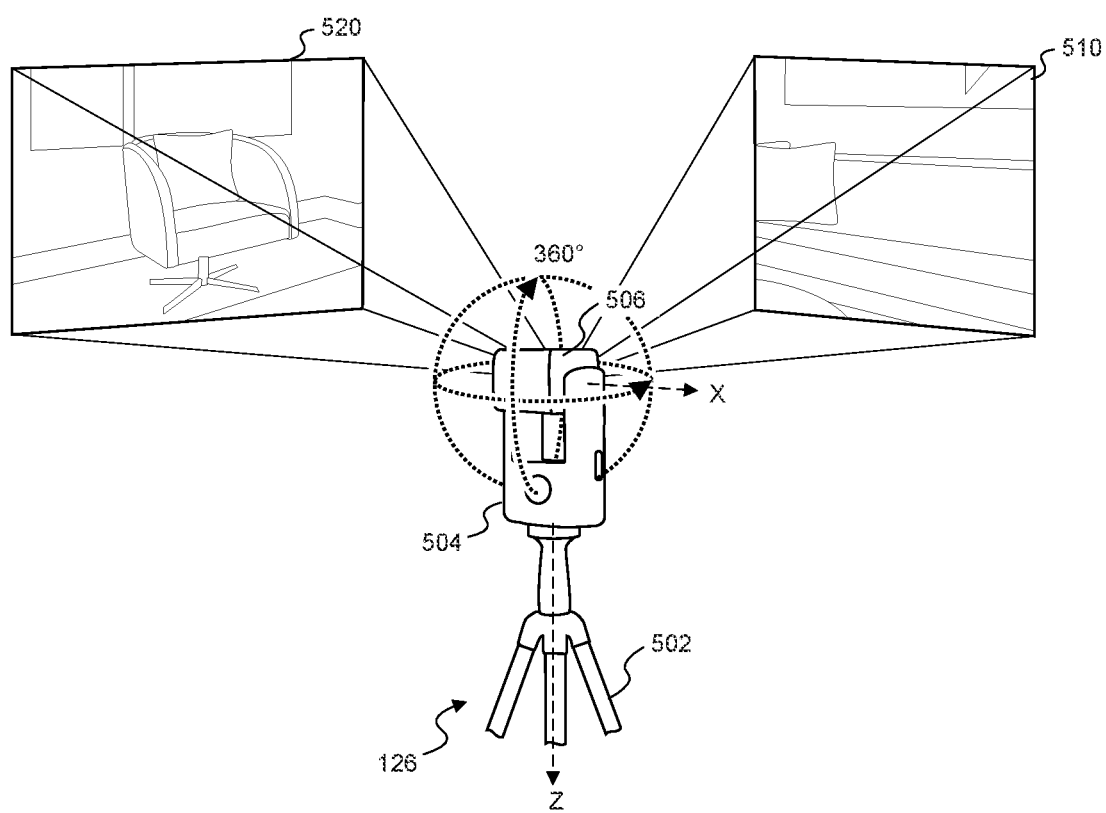
FIG. 5 illustrates an example implementation of an image capture device for capturing composite images within a space, consistent with embodiments of the present disclosure

FIG. 5 illustrates an example implementation of image capture device 126 for capturing composite images within a space, consistent with embodiments of the present disclosure. For example, image capture device 126 may be configured to capture a first image 510 in a first direction relative to image capture device 126 and a second image 520 in a second direction relative to image capture device 126. In some embodiments, image capture device 126 may capture images from different directions using a movable image sensor 440 and lens 442, as described above. For example, image capture device 126 may include a base component 502 and one or more rotatable components 504 and 506. Base component 502 may be any component configured to be at least temporarily fixed at a position within a property. For example, base component may include a tripod or other components to provide stability, as indicated in FIG. 5. Image capture device 126 may include at least one rotatable component 504, which may rotate around a vertical axis Z, as shown. This may enable image sensor 440 and lens 442 to similarly rotate around vertical axis Z, enabling image capture device 126 to capture images in 360 degrees relative to base component 502.

In some embodiments, lens 442 may be configured to allow image capture device 126 to capture sufficient image data based on the rotation of rotatable component 504 relative to base component 502. For example, lens 442 may have a wide field of view such that images 510 and 520 capture a sufficient portion of the surroundings of image sensor 126 without rotation of image sensor 440 and lens 442 in any additional directions. Alternatively or additionally, image capture device 126 may include an additional rotatable component 506 housing image sensor 440 and lens 442. Additional rotatable component 506 may be rotatable about a horizontal axis X to provide an additional degree of freedom for image capture device 126. Accordingly, based on the rotation of rotatable components 504 and 502 relative to each other and to base component 502, images may be captured in all directions relative to image capture device 126. In some embodiments, rotatable components 504 and 506 may be manually rotated by a user, such as user 122 to capture the surroundings of image capture device 126. For example, user 122 may manually rotate image sensor 440 and lens 442 to different orientations and capture images (e.g., image 510 and image 520) at various orientations. Alternatively or additionally, the rotation of image sensor 440 and lens 442 and/or capturing of images may be at least partially automated. For example, image capture device 126 may include one or more motors to automatically rotate rotatable components 504 and 506 to capture a desired range of the surroundings of image capture device 126. In some embodiments, user 122 may move base component 502 (and the rest of image capture device 126) to various positions within a property and image capture device 126 may automatically capture images at the specified position to generate composite images.

Images 510 and 520 (along with various other images captured in other directions relative to image capture device 126) may be combined to form one or more composite images representing the surroundings of image capture device 126. In some embodiments, a composite image may be generated by matching corresponding features in overlapping images to align the images. Accordingly, generating a composite image may include application of various feature or object detection algorithms to images 510 and 520. Alternatively or additionally, various images may be aligned using known orientations relative to image capture device 126 that images 510 and 520 were captured from. For example, based on the orientation of rotatable components 504 and 506, an orientation of images 510 and 520 may be determined, which may be used to align the images.

Figure 6:
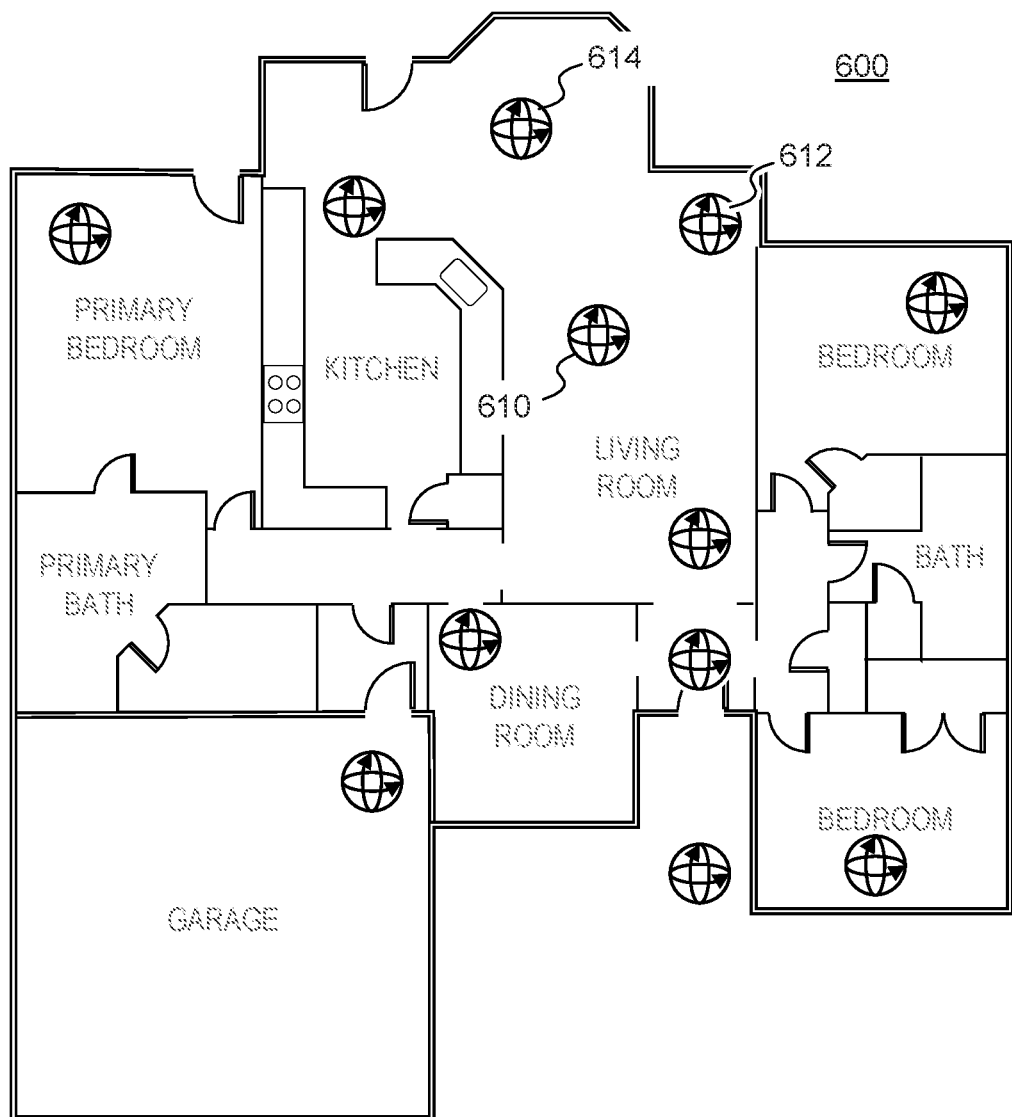
FIG. 6 illustrates an example floorplan of a property, consistent with embodiments of the present disclosure.

FIG. 6 illustrates an example floorplan of a property 600, consistent with embodiments of the present disclosure. In this example, property 600 may be a single-family dwelling such as a house. As described above, image capture device 126 may be used to capture data at various locations within property 600. In some embodiments, this may include capturing composite images representing a view of property 600 across multiple orientations. For example, image capture device 126 may be used to capture a composite image at location 610 which may include a 360 degree view of the living room of property 600. Another composite image showing at least a portion of the living room may be captured at location 612. In some embodiments, the positions of the captured images may be input (or confirmed) by a user, such as user 122. For example, user 122 may select an approximate image capture location within a floor plan when capturing a composite image using image capture device 126. Alternatively or additionally, determining or estimating the positions of locations 610 and 612 may be at least partially automated. For example, various image analysis algorithms may be used to identify features in a composite image captured at location 610, which may be compared to corresponding features appearing in a composite image captured at location 612. Accordingly, a relative position (e.g., distance, elevation, orientation, etc.) between locations 610 and 612 may be determined. This may be repeated across several other locations (e.g., location 614) to develop a map of property 600.

In some embodiments, various camera tracking techniques may be used to determine positions of locations 610, 612, and 614. For example, this may include various simultaneous localization and mapping (SLAM) techniques for camera tracking. This may include the use of various forms of sensor data, such as LIDAR sensors, inertial measurement unit (IMU) sensors, image sensors, and the like. Based on one or more of these types of sensor data, a relative position within a property may be determined. As another example, a trained machine learning model may be used to determine positions of locations 610, 612, and 614. For example, a training set of data may be input into a machine learning model, which may include known positions of composite images captured in different properties. Accordingly, a model may be trained to predict or determine positions for other sets of captured composite images. Consistent with the present disclosure, various training or machine learning algorithms may be used, including a logistic regression, a linear regression, a regression, a random forest, a K-Nearest Neighbor (KNN) model, a K-Means model, a decision tree, a cox proportional hazards regression model, a Naïve Bayes model, a Support Vector Machines (SVM) model, a gradient boosting algorithm, or any other form of machine learning model or algorithm.

The composite image data and other data associated with property 600 (which may be referred to as "virtual tour data") may be uploaded to server 110. Alternatively or additionally, raw or semi-processed data may be uploaded to server 110 and the composite image data and other data may be generated by server 110. As described above, this data may be accessed and/or viewed by user 132 using computing device 130. In some embodiments, the data may be presented in the form of a virtual tour or virtual walkthrough enabling a user to navigate a simulated environment of property 600. For example, computing device 130 may display a user interface allowing user 132 to navigate between the composite images captured at locations 610, 612, and 614.

As used herein, virtual tour data may include one or more images captured at various physical locations within a property. For example, this may include image data captured at locations 610, 612 and 614 using image capture device 126, as described above. In some embodiments, the image data may include composite images such that the images cover a wider field of view than any individual image alone. For example, virtual tour data may include 360-degree images or other forms of panoramic image data captured at each waypoint location. In some embodiments, virtual tour data may include additional information, such as location data associated with the images, timestamp information, information about the property associated with virtual tour data (e.g., an address, a listing ID, a property ID, an agent associated with the property, etc.), or various other forms of data. Virtual tour data may not necessarily have been captured in a single image capture session. For example, virtual tour data may have been captured over the course of multiple days, weeks, months, or years, depending on the application. Accordingly, server 110 (or another device of system 100) may store data associated with one or more properties (e.g., in database 112), which may be supplemented as additional data is captured. In some embodiments, system 100 may allow user 122 or another user to manage data associated with a property. For example, this may include adding or removing image capture sessions, adding or removing data within an image capture session, or the like.

Figure 7:
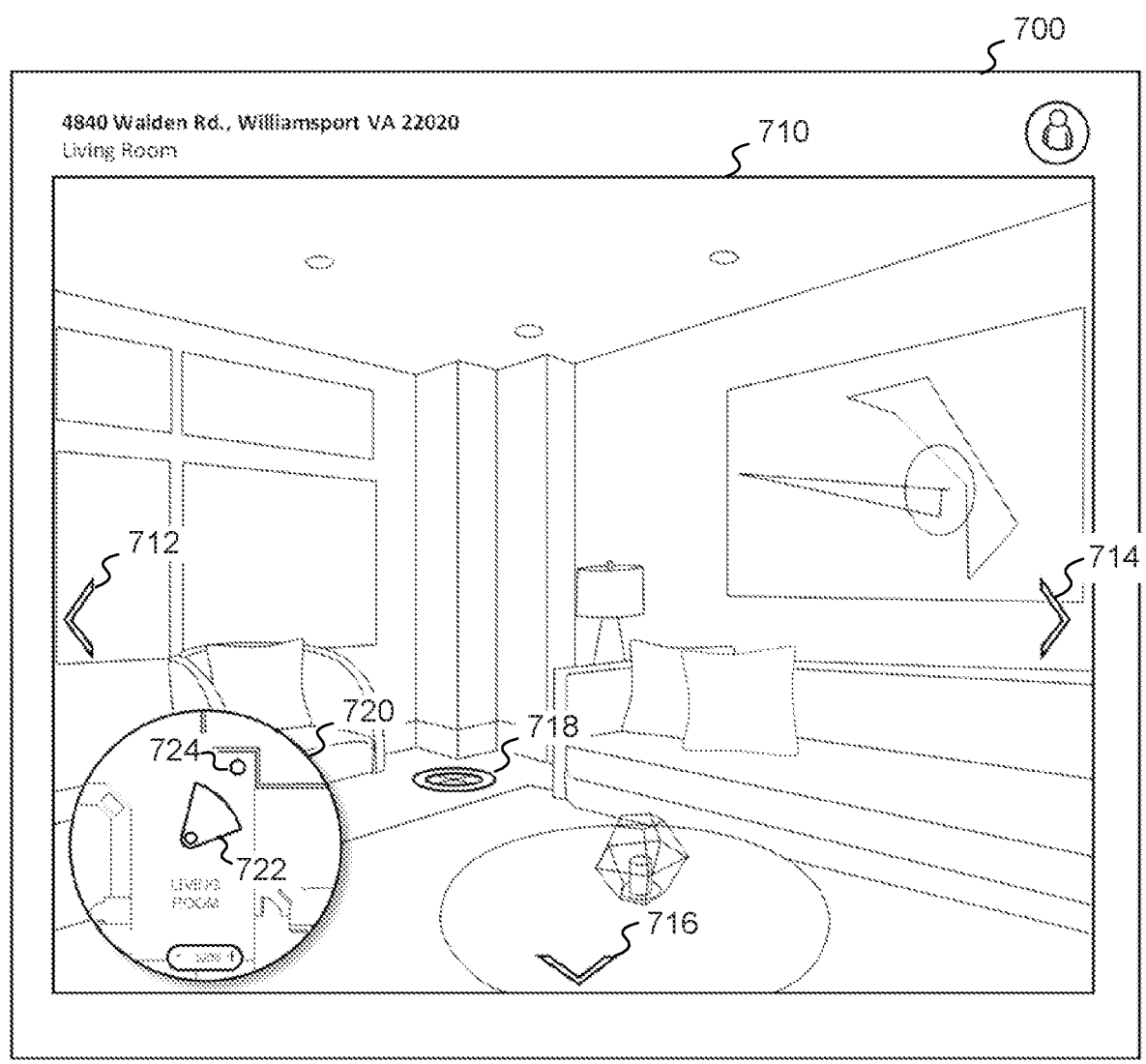
FIG. 7 illustrates an example user interface for providing a virtual tour of a property consistent with embodiments of the present disclosure.

FIG. 7 illustrates an example user interface 700 for providing a virtual tour of a property consistent with embodiments of the present disclosure. User interface 700 may be presented via a display of a display device to allow a user to view and interact with virtual tour data associated with a property. For example, user interface 700 may be presented on a display 342 of computing device 120 or 130 to allow user 122 or user 132 to view virtual tour data captured within property 600. User interface 700 may include a viewing pane 710 configured to display images of property 600. For example, viewing pane 710 may display at least a portion of a composite image captured at various locations within property 600. In the example shown in FIG. 7, viewing pane 710 may display a portion of a composite image captured at location 610, as described above.

User interface 700 may include various navigation elements 712, 714, 716, and 718, which may allow a user to update the view shown in viewing pane 710. Accordingly, user interface 700 may allow the user to navigate virtually through property 600 to simulate an actual walkthrough of property 600. For example, navigation elements 712 and 714 may allow the user to pan left or right within a composite image captured at location 610. Navigation element 716 may allow a user to move to a location behind the view currently shown in viewing pane 710. Similarly, user interface 700 may include navigation elements for moving forward to locations ahead of the current view. In some embodiments, user interface 700 may overlay navigation element 718 on an image, which may represent the position of another location the user may navigate to. For example, navigation element may represent location 612 as shown in FIG. 6. Accordingly, selection of navigation element 718 may cause viewing pane 710 to show a composite image captured at location 612. In some embodiments, user interface 700 may include a zoom element, allowing a user to zoom in or out of the image shown in viewing pane 710.

In some embodiments, user interface 700 may further include a map element 720 showing a birds-eye view of property 600. Map element 720 may include a current view element 722, which may show an approximate location of current view displayed in viewing pane 710 (including position, orientation, or both). In some embodiments, map element 720 may also display navigation elements, such as navigation element 724 for moving to different locations within the property. For example, selecting navigation element 724 may cause viewing pane 710 to display a composite image captured at location 612, similar to navigation element 718. In some embodiments, user interface 700 may include a toggle button or other option to hide (or display) map element 720.

While various navigation elements are shown in FIG. 7 by way of example, one skilled in the art would recognize various other ways a user may navigate virtually through a property. For example, user interface 700 may allow a user to pan around at a particular location by clicking and dragging viewing pane 710. As another example, a user may navigate through keyboard 344 and/or another input device (e.g., a mouse, joystick, etc.). For example, the user may look around within a composite image by moving a mouse and may navigate between various locations using the arrow keys or other keys of keyboard 344. In some embodiments, viewing pane 710 may be presented within a virtual reality headset or other wearable device. Accordingly, user 132 may navigate at least partially by moving his or her head in different directions.

While various example user interfaces are provided throughout the present disclosure, it is to be understood that the various elements, layouts, and information presented therein are shown by way of example. One skilled in the art would recognize that various other forms of user interfaces may be implemented, depending on the particular application or based on individual preferences. For example, while user interface 700 is presented as a viewing pane with navigational elements overlayed on the image, one skilled in the art would recognize that similar information may be acquired through various other user interface layouts and controls. Accordingly, any of the various user interfaces presented herein may include various forms of buttons, text input fields, radio buttons, checkboxes, dropdown lists or menus, links, breadcrumbs, timelines, tabs, links, tree panes, menus, accordion controls, icons, tooltips, alerts, pop-ups, touchscreen interfaces, or any other form of element for inputting and/or displaying information.

In some embodiments, the various techniques described herein may include application of one or more trained machine learning algorithms. These machine learning algorithms (also referred to as machine learning models in the present disclosure) may be trained using training examples to perform particular functions (including both supervised and/or unsupervised), as described more specifically in the various examples herein. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may include an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs.

Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters. For example, the hyper parameters may be set automatically by a process external to the machine learning algorithm (such as a hyper parameter search algorithm), and the parameters of the machine learning algorithm may be set by the machine learning algorithm according to the training examples. In some implementations, the hyper-parameters are set according to the training examples and the validation examples, and the parameters are set according to the training examples and the selected hyper-parameters.

In some embodiments, trained machine learning algorithms (also referred to as trained machine learning models in the present disclosure) may be used to analyze inputs and generate outputs, for example in the cases described below. In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value for the sample. In yet another example, a trained machine learning algorithm may include a clustering model, the input may include a sample, and the inferred output may include an assignment of the sample to at least one cluster. In an additional example, a trained machine learning algorithm may include a classification algorithm, the input may include an image, and the inferred output may include a classification of an item depicted in the image. In yet another example, a trained machine learning algorithm may include a regression model, the input may include an image, and the inferred output may include an inferred value for an item depicted in the image (such as an estimated property of the item, such as size, volume, age of a person depicted in the image, cost of a product depicted in the image, and so forth). In an additional example, a trained machine learning algorithm may include an image segmentation model, the input may include an image, and the inferred output may include a segmentation of the image. In yet another example, a trained machine learning algorithm may include an object detector, the input may include an image, and the inferred output may include one or more detected objects in the image and/or one or more locations of objects within the image. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

In some embodiments, artificial neural networks may be configured to analyze inputs and generate corresponding outputs. Some non-limiting examples of such artificial neural networks may include shallow artificial neural networks, deep artificial neural networks, feedback artificial neural networks, feed forward artificial neural networks, autoencoder artificial neural networks, probabilistic artificial neural networks, time delay artificial neural networks, convolutional artificial neural networks, recurrent artificial neural networks, long short-term memory artificial neural networks, and so forth. In some examples, an artificial neural network may be configured by a user. For example, a structure of the artificial neural network, a type of an artificial neuron of the artificial neural network, a parameter of the artificial neural network (such as a parameter of an artificial neuron of the artificial neural network), and so forth may be selected by a user. In some examples, an artificial neural network may be configured using a machine learning algorithm. For example, a user may select hyper-parameters for the artificial neural network and/or the machine learning algorithm, and the machine learning algorithm may use the hyper-parameters and training examples to determine the parameters of the artificial neural network, for example using back propagation, using gradient descent, using stochastic gradient descent, using mini-batch gradient descent, and so forth. In some examples, an artificial neural network may be created from two or more other artificial neural networks by combining the two or more other artificial neural networks into a single artificial neural network.

In some embodiments, analyzing image data (for example by the methods, steps and modules described herein) may include analyzing the image data to obtain a preprocessed image data, and subsequently analyzing the image data and/or the preprocessed image data to obtain the desired outcome. Some non-limiting examples of such image data may include one or more images, videos, frames, footages, 2D image data, 3D image data, and so forth. One of ordinary skill in the art will recognize that the following are examples, and that the image data may be preprocessed using other kinds of preprocessing methods. In some examples, the image data may be preprocessed by transforming the image data using a transformation function to obtain a transformed image data, and the preprocessed image data may comprise the transformed image data. For example, the transformed image data may comprise one or more convolutions of the image data. For example, the transformation function may comprise one or more image filters, such as low-pass filters, high-pass filters, band-pass filters, all-pass filters, and so forth. In some examples, the transformation function may comprise a nonlinear function. In some examples, the image data may be preprocessed by smoothing at least parts of the image data, for example using Gaussian convolution, using a median filter, and so forth. In some examples, the image data may be preprocessed to obtain a different representation of the image data. For example, the preprocessed image data may comprise: a representation of at least part of the image data in a frequency domain; a Discrete Fourier Transform of at least part of the image data; a Discrete Wavelet Transform of at least part of the image data; a time/frequency representation of at least part of the image data; a representation of at least part of the image data in a lower dimension; a lossy representation of at least part of the image data; a lossless representation of at least part of the image data; a time ordered series of any of the above; any combination of the above; and so forth. In some examples, the image data may be preprocessed to extract edges, and the preprocessed image data may comprise information based on and/or related to the extracted edges. In some examples, the image data may be preprocessed to extract image features from the image data. Some non-limiting examples of such image features may comprise information based on and/or related to: edges; corners; blobs; ridges; Scale Invariant Feature Transform (SIFT) features; temporal features; and so forth.

In some embodiments, analyzing image data (for example, by the methods, steps and modules described herein) may include analyzing the image data and/or the preprocessed image data using one or more rules, functions, procedures, artificial neural networks, object detection algorithms, face detection algorithms, visual event detection algorithms, action detection algorithms, motion detection algorithms, background subtraction algorithms, inference models, and so forth. Some non-limiting examples of such inference models may include: an inference model pre-programmed manually; a classification model; a regression model; a result of training algorithms, such as machine learning algorithms and/or deep learning algorithms, on training examples, where the training examples may include examples of data instances, and in some cases, a data instance may be labeled with a corresponding desired label and/or result; and so forth.

Customized Property Landing Pages

As described above, the disclosed embodiments may allow a user, such as user 122, to capture virtual tour data or other data from within a property. For example, user 122 may capture image data, location point data, dimension data, or various other forms of data within a property using image capture device 126, as described above. In some embodiments, the system may automatically process this captured data to present it to other users, such as user 132, which may be presented in the form of a landing page. As used herein, a landing page may refer to a website or webpage allowing a client or user (e.g., a potential buyer) to view various information about a property.

This landing page may be generated with minimal input required from a user. For example, a dashboard may be provided to allow an agent or other user to generate landing pages for properties with minimal effort and without the need for web programming skills. In some embodiments, the system may pull data captured by the agent to generate the landing page automatically with minimal or no input from the agent. For example, once an image capture session is completed by user 122, system 100 automatically extracts images and other data, analyzes the data, and generates a landing page for the property. In some embodiments, this may include modifying the extracted data or generating new content based on the extracted data, which may be included in the landing page.

Figure 8:
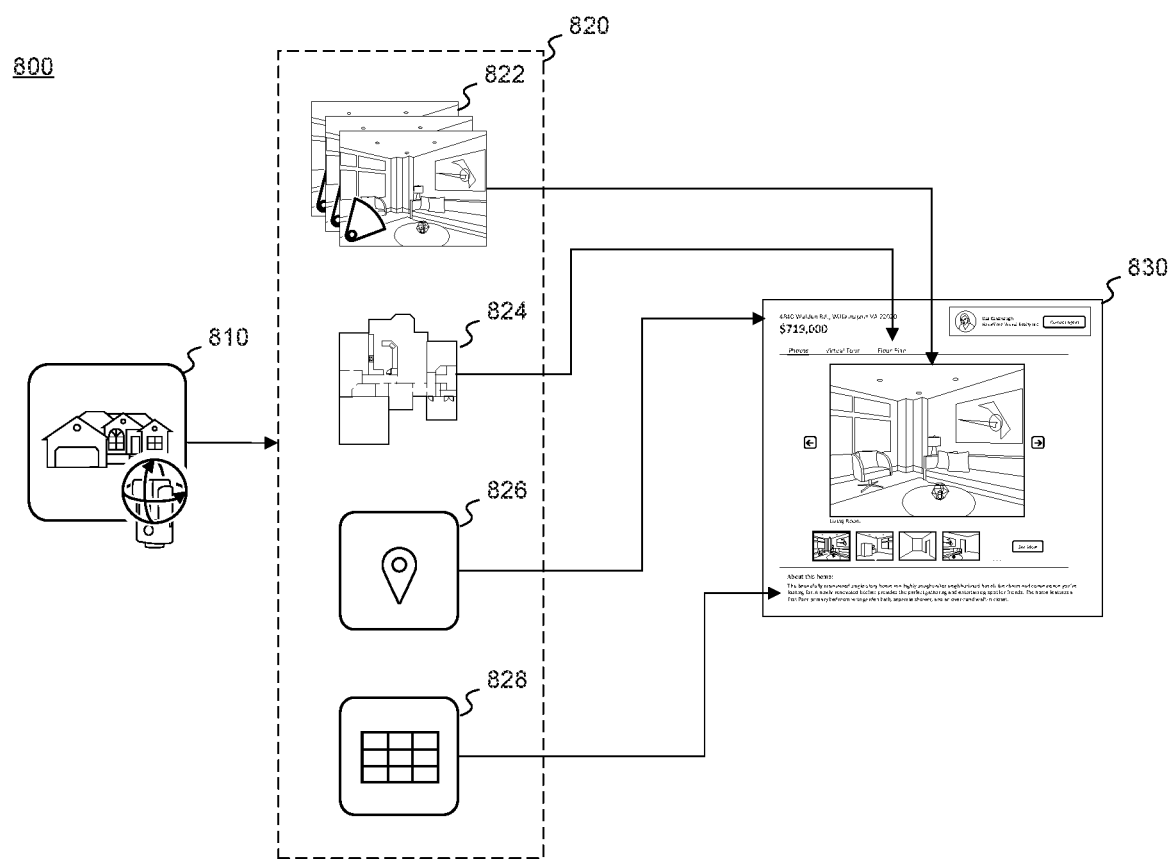
FIG. 8 illustrates an example process for generating a customized landing page, consistent with embodiments of the present disclosure.

FIG. 8 graphically represents an example process 800 for generating a customized landing page, consistent with embodiments of the present disclosure. Process 800 may include receiving or accessing image capture session data 810. From this image capture session data 810, various property data 820 may be extracted and automatically placed to generate a landing page 830. For example, process 800 may include causing landing page 830 to be displayed via a user interface on computing device 130. In some embodiments, process 800 may be performed by one or more processing devices of a server, such as processor 210. For example, image capture session data 810 may be captured from within a property using image capture device 126 by user 122. Image capture session data 810 may then be uploaded to server 110 via network 140. Server 110 may then analyze image capture session data 810 to extract and/or generate property data 820, as described in further detail below. Alternatively or additionally, some or all of process 800 may be performed by another device in system 100, such as computing device 120, computing device 130, mobile device 124, or image capture device 126 (or any combination thereof).

Notably, in some embodiments, landing page 830 may be generated with minimal or no input or direct intervention from user 122. For example, user 122 may conduct an image capture session to generate image capture session data 810. Upon completion of the image capture session (or at various stages during the image capture session), property data 820 may be extracted for generating landing page 830. Accordingly, landing page 830 may be generated without requiring further time, effort, or skills on the part of user 122. An image capture session may be determined to be complete based on a variety of events. In some embodiments, user 122 may manually indicate that a session is complete, for example, by pressing a button or selecting an option via one or more of devices 120, 124, and 126. As another example, an image capture session may be assumed to have been completed based on an elapsed time since an image was captured. For example, if user 122 has stopped capturing images using image capture device for more than 1 hour (or various other suitable periods), system 100 may assume a session is complete and begin generating property data 820 and/or landing page 830. As another example, an image capture session may be deemed complete based on a physical location of user 122 or one or more of devices 120, 124, and 126. For example, server 110 (or another component of system 100) may determine an image capture session is complete based on a distance between the location of the property and a location of image capture device 126 (or devices 120 or 124) exceeding a threshold distance, which may indicate that user 122 has left the property.

As described above, the image capture session data 810 may include one or more images captured at various physical locations within a property. For example, this may include image data captured at locations 610, 612 and 614 using image capture device 126, as described above. In some embodiments, the image data may include composite images such that the images cover a wider field of view than any individual image alone. For example, image capture session data 810 may include 360-degree images or other forms of panoramic image data captured at each waypoint location. In some embodiments, image capture session data 810 may include additional information, such as location data associated with the images, timestamp information, information about the property associated with image capture session data 810 (e.g., an address, a listing ID, a property ID, an agent associated with the property, etc.), or various other forms of data. Image capture session data 810 may not necessarily have been captured in a single image capture session. In some embodiments, image capture session data 810 may have been captured over the course of multiple days, weeks, months, or years, depending on the application. Accordingly, server 110 (or another device of system 100) may store data associated with one or more properties (e.g., in database 112), which may be supplemented as additional data is captured. In some embodiments, system 100 may allow user 122 or another user to manage data associated with a property. For example, this may include adding or removing image capture sessions, adding or removing data within an image capture session, or the like.

In some embodiments, image capture session data 810 may be processed further prior to extracting and/or generating property data 820. For example, this processing may include adjusting image properties (e.g., brightness, contrast, color, resolution, etc.), combining or merging image data (which may include generating composite images), warping image data, upscaling or downscaling images, compressing data, or the like. This processing may occur at server 110, computing device 120, mobile device 124, or image capture device 126 (or any combination thereof).

Property data 820 may include any information associated with a property, including the example information shown in FIG. 8. In some embodiments, property data 820 may include image data 822, which may images captured using image capture device 126 during one or more image capture sessions. In some embodiments, image data 822 may be a subset of images captured during the one or more image capture sessions. For example, server 110 may select a subset of images to use as image data 822. The images may be selected according to various criteria. For example, server 110 may analyze images captured during an image capture session to assess a quality of the images and may select images having the highest quality. For example, the quality may be assessed in terms of contrast, clarity, focus, composition, or any other aspects of an image. In some embodiments, server 110 may select images based on the content of the images. For example, server 110 may select images showing features that may be of interest to a potential buyer or renter of a property. For example, the system may automatically detect entry doors (e.g., front doors, back doors, etc.), which may be assigned a greater level of interest than interior doors. Other examples of features of interest may include fireplaces, storage spaces, countertops, appliances, showers, light fixtures, architectural features, furniture, artwork, or any other objects that may be of interest to a user. Further, server 110 may avoid selecting images of utility rooms, hallways, corners of rooms or other areas that may not be of interest to a user.

In order to identify and classify various features within a property, the system may use one or more image processing algorithms to detect features within the images. For example, this may include scale-invariant feature transforms (SIFT), a histogram of oriented gradients (HOG) features, or other image analysis techniques as described herein. Alternatively or additionally, system 100 may use a trained machine learning algorithm for detecting features within an image. For example, a training algorithm, such as convolutional neural network (CNN) may receive training data in the form of image data with labels indicating features of interest along with classifications of the features (e.g., "fireplace," "stove," etc.). The training data may be labeled such that the features are identified in the image data. For example, the images may be labeled with polygonal lines or other indications of the features. As a result, a model may be trained to generate similar classifications of features in images included in virtual tour data. In some embodiments, this may also include a reward function approach that rewards correct selections. Consistent with the present disclosure, various training or machine learning algorithms may be used, including a logistic regression, a linear regression, a regression, a random forest, a K-Nearest Neighbor (KNN) model, a K-Means model, a decision tree, a cox proportional hazards regression model, a Naïve Bayes model, a Support Vector Machines (SVM) model, a gradient boosting algorithm, or any other form of machine learning model or algorithm.

In some embodiments, the system may also classify rooms based on image analysis, which may be used in selecting images to include in image data 820. In some embodiments, the room classification may be based on features detected in the room. For example, if an image includes features such as a range, a dishwasher, a refrigerator, or similar features, the system may determine the image depicts a kitchen. Accordingly, server 110 may store a database or other data structure associating feature classifications with one or more room classifications. Alternatively or additionally, room classification may be performed separately from detecting features. For example, a separate machine learning model may be trained to classify rooms based on image data.

In some embodiments, image data 822 may be selected to provide highlights of a property. For example, this may include selecting images showing a predefined set of rooms or views, such as a kitchen, primary bedroom, primary bathroom, secondary bedrooms, living room, and an exterior of the property. Accordingly, system 100 may rate each image classified as showing a kitchen (e.g., in terms of clarity, brightness, composition, etc.) and select the highest rated image (or a predetermined number of images) for inclusion in image data 822. In some embodiments, image data 822 may include one or more views within a property selected from captured image data. For example, as described above, the captured images may include 360-degree images or other panoramic image data. Accordingly, image data 822 may include specific views from within the panoramic images to include as images of the property. These views may be selected based on rooms or features of the property represented in the images, as described above.

In some embodiments, property data 820 may further include floorplan information 824. Floorplan information 824 may be an image or other data showing a view from above of the relationships between rooms, spaces, and other physical features of a property. For example, floorplan information 824 may include an image (e.g., in .jpeg, .png, .tiff, .bmp, .pdf formats, etc.), a drawing file (e.g., in .dwg, .dxf, .dgn, .rfa, .pln, or various other formats), measurement data, or the like. In some embodiments, floorplan information 824 may be uploaded or otherwise provided by a user, such as user 122. As another example, floorplan information 824 may be accessed from a database, such as database 112, or an external database, such as a multiple listings service (MLS) server. In some embodiments, floorplan information 824 may be generated automatically based on an image capture session. For example, system 100 may analyze images captured using image capture device 126 to determine spatial relationships between walls, rooms, or other features. In some embodiments, this may include determining spatial relationships between locations where images are captured from, such as locations 610, 612, and 624, as described above. In some embodiments, a machine learning model may be trained to extract floorplan information 824. For example, a training set of image data may be input into a machine learning algorithm, along with corresponding floorplans properties that each set of images is captured from. The model may be trained using this training data to generate floorplans based on other sets of images. In some embodiments, image capture device 126 may further include a LIDAR sensor for capturing distances to various objects represented in the images, which may be used to generate floorplan information 824.

Property data 820 may further include location data 826, as shown in FIG. 8. Location data 826 may include any information indicating a location of a property. In some embodiments, location data 826 may include an address of a property, which may be specified by user 122, accessed from a database (e.g., database 122 or an external database), or the like. In some embodiments, when beginning an image capture session, user 122 may select a property or a project associated with a property, and an address may be accessed (e.g., from database 112) based on the selected property or project. As another example, location data 826 may include coordinate information. For example, one or more of devices 120, 124, and 126, may include one or more global positioning system (GPS) sensors, which may be used to determine an approximate location of a property during an image capture session. In some embodiments, system 100 may convert between different types of location data. For example, GPS coordinates may be captured during an image capture session and may be compared to a map database or other database to identify an address associated with the image capture session, which may be stored as location data 826.

In some embodiments, property data 820 may include attribute data 828. Attribute data 828 may include any information describing various attributes or characteristics of a property. For example, attribute data 828 may include one or more of a price, a property type (e.g., single family home, condo, multi-family home, mobile home, farm, land, etc.), a number of bedrooms, a number of bathrooms, a listing status, a square footage, a number of stories, a garage type, parking information, heating or cooling features, a number or type of rooms, exterior features, amenities, appliances, or any other features or characteristics of a property. In some embodiments, some or all of these attributes may be specified by a user, such as user 122. For example, this may occur when initially generating a project or property listing and this information may be stored in a database, such as database 122. Alternatively or additionally, some or all of this information may be accessed from an external source, such as an MLS listing associated with the property.

According to some embodiments, some or all of attribute data 828 may be generated by server 110 or another component of system 100. For example, this may include analyzing captured image data using object recognition algorithms or a trained model to identify rooms, appliances, architectural features, or other attributes of a property, as described herein. In some embodiments, this may include characterizing various features of a property that are detected in the images. For example, server 110 may be configured to detect a floor represented in one or more images of a property and may determine a type of flooring, such as carpet, hardwood, laminate, tile, or other flooring types depicted in the images. In some embodiments, generating attribute data 828 may include performing various calculations based on captured data. For example, server 110 may analyze captured image data to determine a number of bedrooms or bathrooms represented in the images. As another example, sever 110 may estimate the size or type of a garage based on image data. For example, this may include detecting an approximate size of the garage, or identifying a number of vehicles in the garage, or the like. Similarly, a heating and/or cooling attribute of a property may be determined by detecting ventilation ducts or grates in one or more images (which may indicate forced air heating or cooling), air conditioning units (e.g., exterior air conditioning unit boxes, window air conditioning units, etc.), furnaces, or the like. A livable area or square footage of a property may also be estimated based on image data. Alternatively or additionally, a livable area may be calculated based on floorplan information 824, which may include shape data, dimensions, or other spatial information. In some embodiments, captured image data may be used to determine a scale of floorplan information 824 (e.g., where floorplan information 824 is represented as a pdf image), which may allow a livable area to be estimated based on floorplan information 824.

Once property data 820 has been extracted and/or generated, it may be made available for presenting landing page 830. In some embodiments, this may include labeling or storing property data 820 in a manner indicating which data represents which type of information. Accordingly, when a user (e.g., user 132) accesses a landing page associated with a property, property data 820 may be used to populate the landing page. For example, landing page 830 may include an element for displaying photos of a property and image data 822 may be stored in a manner indicating that it should be displayed within the element for displaying photos. In some embodiments, this may include storing property data 820 in a data structure, such as in database 112. For example, image data 822, floorplan information 824, location data 826, and attribute data 828 may be stored in a data structure in an associative manner with a property ID. Accordingly, when generating (or accessing) a landing page for a property associated with the property ID, the landing page may be populated with property data 820.

Figure 9:
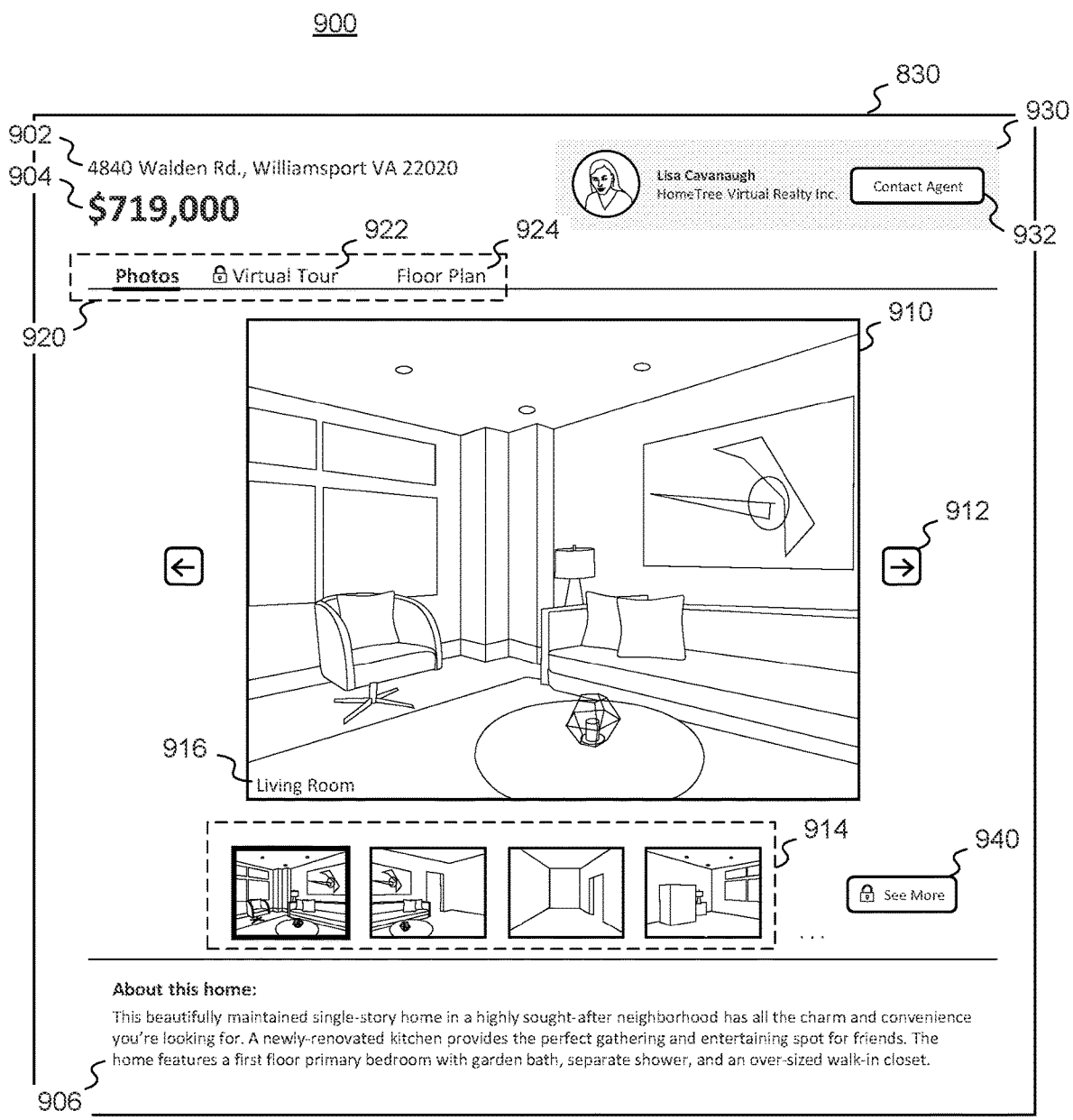

Landing page 830 may display property data 820 in any suitable manner and in various layouts or formats. In some embodiments, landing page 830 may not necessarily be a single page or view and may multiple pages or views. For example, landing page 830 may organize various components of property data 820 into different views. FIG. 9 illustrates an example view 900 of a landing page, consistent with embodiments of the present disclosure. For example, view 900 may be one view of landing page 830, as described above. In this example, view 900 may include an image element 910 for displaying photos of a property. For example, image element 910 may be configured to display image data 822 described above. In the example shown in FIG. 9, image element 910 may be configured to show one image from image data 822 at a time. View 900 may include various navigation elements, such as navigation element 912, which may allow a user to scroll through image data 822. As another example, navigation element 914 may include a series of thumbnails of images included in image data 822. Selecting one of the thumbnails may cause a corresponding image to be displayed in image element 910. In some embodiments, view 900 may include a description 916 of the image displayed in image element 910. For example, this may include a classification of a room represented in the image, as shown in FIG. 9. In some embodiments, the classification may be determined by system 100 automatically based on analysis of image data 822, as described above.

Landing page 830 may include various other information associated with a property, including any of the various information described above with respect to location data 826 and attribute data 828. For example, landing page 830 may include a property address 902 (which may be based on location data 826) and price information 904. In some embodiments, landing page 830 may include a description 906, which may be a text-based summary or promotion for the property. In some embodiments description 906 may be created by user 122, for example, when listing a property. Accordingly, description 906 may be accessed from a storage location, such as database 112. Alternatively or additionally, description 906 may be generated automatically based on attribute data 828 or other property data. For example, database 112 or another storage location may store a plurality of prestored descriptions with associated attributes and server 110 may select a matching (or at least partially matching) description from the prestored descriptions based on attribute data 828. In some embodiments, the prestored descriptions may have one or more fields that are populated based on property data 200. For example, server 110 may select a prestored description for a single-story, single family home based on an indication in attribute data 828 that the property is a single-family home and has only one floor. The description may include a field for indicating the number of bathrooms and listing various features of the home, which may be populated based on attribute data 828. In some embodiments, rather than complete descriptions, database 112 may store various snippets of text, which may be one or more preset sentences describing a property. Server 110 may select a plurality of applicable snippets based on attribute data 828 and may combine them to generate description 906. The snippets may further include fields that are also populated based on attribute data 828 (or property data 820), as described above.

In some embodiments, landing page 830 may further include agent detail pane 930, as shown in FIG. 9. Agent detail pane 930 may include various information about an agent associated with a property, which may correspond to user 122. For example, agent detail pane 930 may include a name, contact information, position, experience level, professional description or bio, location, photograph, or various other forms of information. In some embodiments, agent detail pane 930 may include a contact element 932, which may enable or facilitate contact with user 122. For example, electing contact element 932 may open an email hyperlink, open a chat window, display contact details (e.g., phone number, email address, etc.), open a messaging platform associated with system 100, or the like. In some embodiments, landing page 830 may be a uniform landing page that is free of any agent information, such as contact details, branding, or other agent- or agency-specific information.

In some embodiments, various information associated with a property may be restricted based on properties of a user, such as user 132. For example, user 132 may be assigned access privileges or rights, which may define which content is viewable within landing page 830. As another example, various information may be included behind a login wall, which may require a user viewing the landing page to login to access various content. In some embodiments, this may prevent entire categories of content (e.g., pricing, availability dates, floorplans, etc.) from being viewed without a login. In the example, shown in FIG. 9, virtual tour data accessible through element 922 may be restricted. Alternatively or additionally, this may allow specific items to be placed behind the login wall. For example, particular photos, particular floors of a floorplan, particular views in a virtual walkthrough, or other content may be restricted to logged in users. In some embodiments, the system may automatically suggest or select items to be placed behind the login wall. For example, system 100 may automatically make photos of a kitchen, primary bedroom, living room, and exterior of a property available publicly, but may restrict access to other images within image data 828. In some embodiments, user 122 may select various items to be restricted through a user interface, as described further below.

While a "login" wall is provided by way of example, it is to be understood that this may not necessarily require a user to have an account for a platform and various other inputs may be required by a user to access additional content. For example, this may include requiring a user to input personal information (e.g., name, contact information, etc.) to access the gated or restricted content. Based on entering the additional information, the user may be granted access to the content, or may be contacted by an agent in order to access the content. Various other forms of input-based access walls may be used. As shown in FIG. 9, landing page 830 may include an element 940 indicating that one or more items are hidden and allowing a user to login or provide additional information to view the restricted information. For example, selecting element 940 may open a login interface, allowing user 132 to login to system 100.

According to some embodiments, landing page 830 may include a navigation element 920 for navigating between various views. For example, view 900 may be a view for showing photos of a property, as described above. Navigation element 920 may include an element 922 for displaying a virtual tour view and an element 924 for displaying a floorplan view, as described further below. Landing page 830 may include various other views and the views shown in FIG. 9 are provided by way of example.

Figure 10:
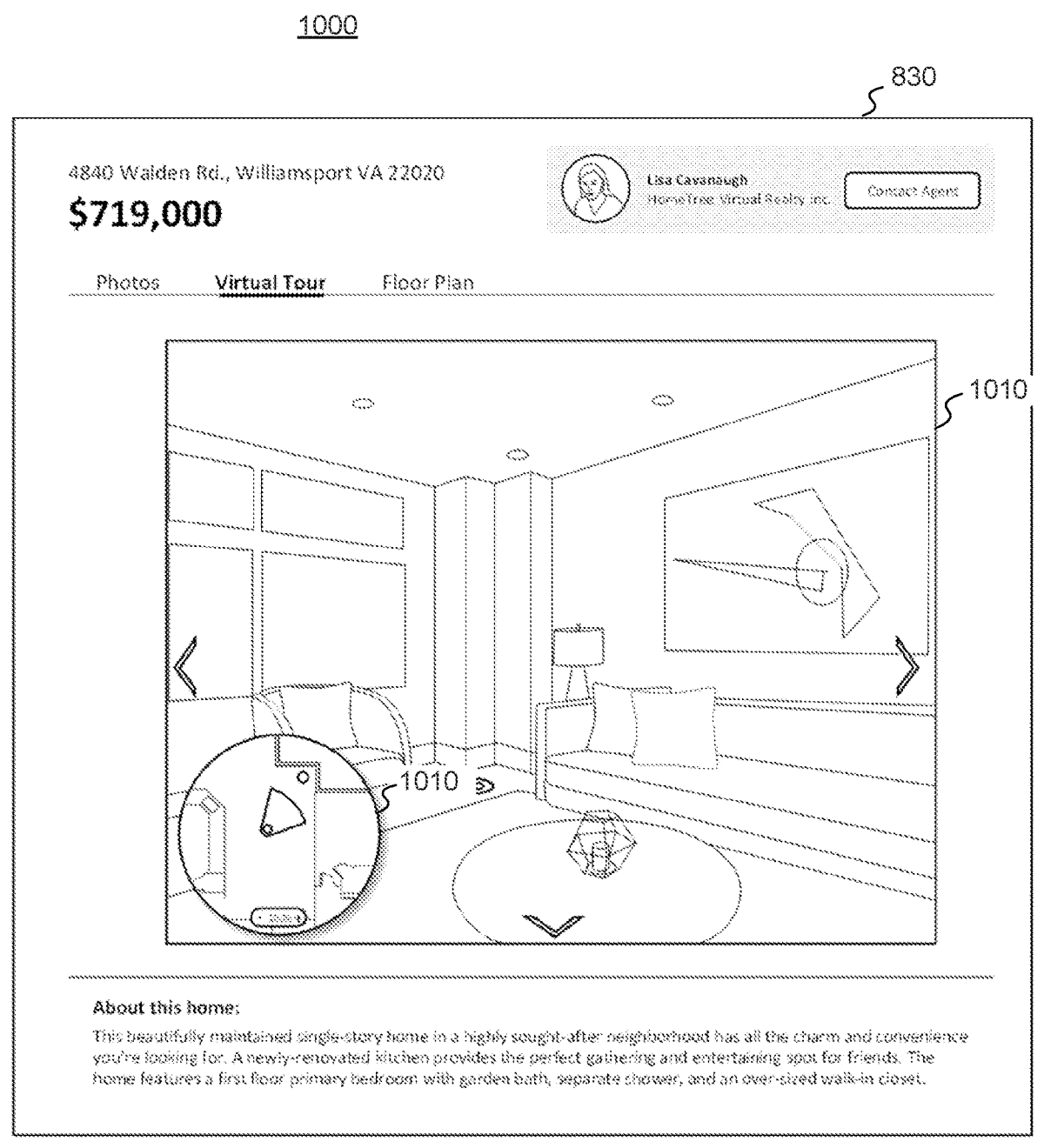

FIG. 10 illustrates another example view 1000 of landing page 830, consistent with embodiments of the present disclosure. View 1000 may be a virtual tour view associated with a property and may be accessed by selecting element 922, as described above. View 1000 may include viewing pane 1010 (which may also be referred to as a virtual tour element) for displaying a particular view within a property, which may be the same as or similar to viewing pane 710. Accordingly, any of the various embodiments or features described above with respect to user interface 700 may equally apply to view 1000 of landing page 830. In some embodiments, one or more aspects of viewing pane 1010 may be restricted behind a login wall (or similar "wall"), as described above. For example, this may include restricting portions of the property user 132 may navigate to through pane 1010 without logging in or providing additional contact information, or the like. In some embodiments, various features of viewing pane 1010, such as map element 1020 (which may correspond to map element 720 describes above) or various other navigation elements may be restricted.

Figure 11:

FIG. 11 illustrates another example view 1100 of landing page 830, consistent with embodiments of the present disclosure. View 1100 may be a virtual tour view associated with a property and may be accessed by selecting element 924, as described above. Accordingly, view 1100 may include a floorplan element 1110 showing a layout of at least one floor of a property. Floorplan element 1110 may include or may be based on floorplan information 824 as described above. In some embodiments, floorplan element 1110 may be interactive, allowing user 132 to zoom in or out, and/or pan around to different views or areas of the property. In some embodiments, view 1100 may further include property details pane 1120, which may include various information associated with a property, including the various information described above with respect to attribute data 828. While property details pane 1120 and various other elements within landing page 830 are shown in certain views or arrangements, it is to be understood that the view shown herein are provided by way of example, and various other arrangements of information may be used.

In some embodiments, a user interface may be provided allowing an agent or other user to customize the landing page. The information included in the landing page may be customized in various ways. In some embodiments, the interface for generating the landing page may offer various templates for specifying the type of information displayed. For example, this may include templates for displaying generated content only, generated content and a property description, generated content and agent information, all available information, or various other combinations of information. In some embodiments, a more granular tuning of information may be allowed. For example, the interface may include checkboxes or other interface elements for specifying whether specific information should be displayed. For example, an agent may elect to leave pricing information off of the landing page, but display other property details. Alternatively or additionally, the interface may provide templates associated with the appearance of the landing page. For example, this may allow the user to customize the layout, size, shape, background, color, or other details of various elements in the landing page.

Figure 12:
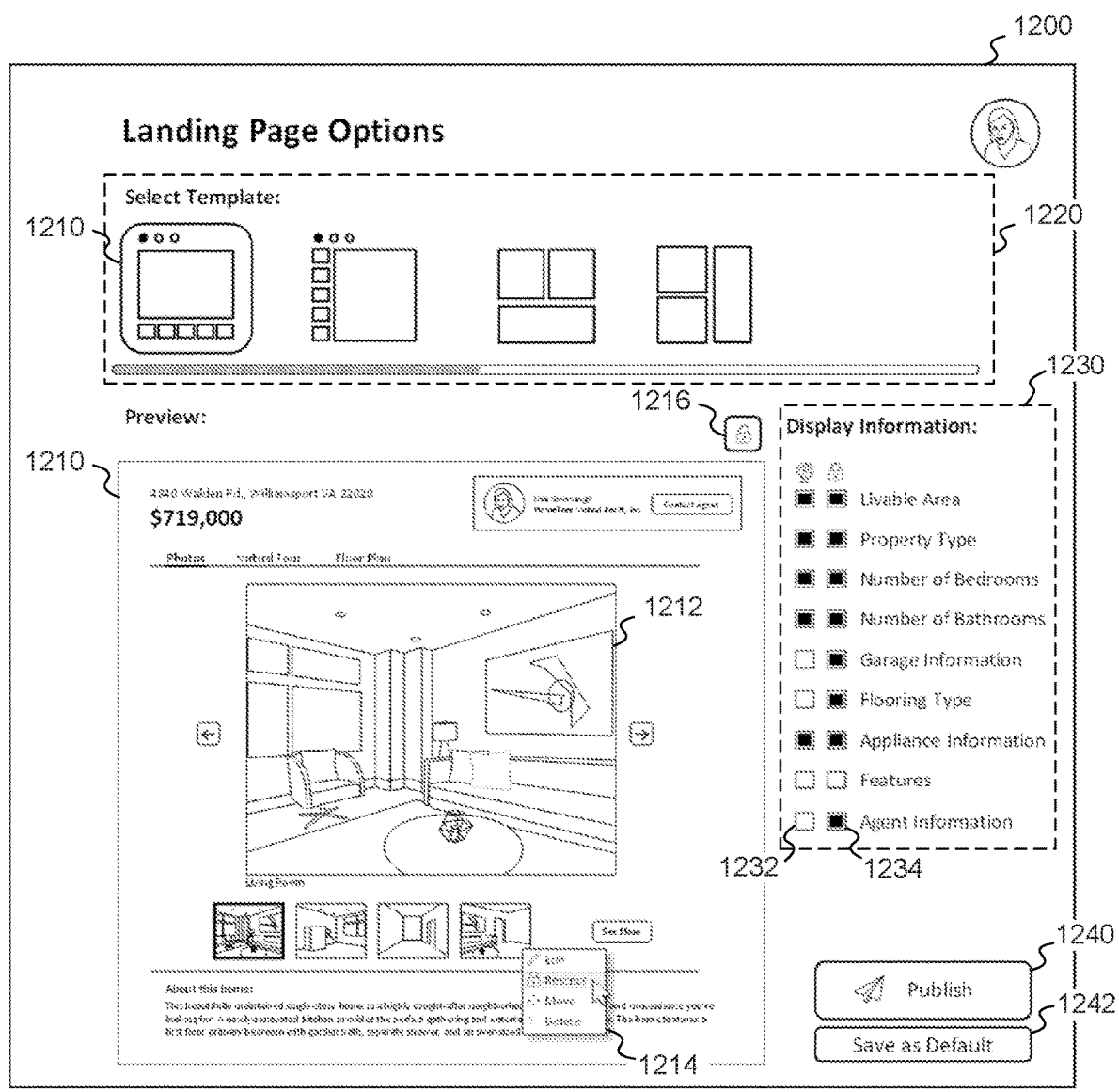
FIG. 12 illustrates an example user interface for generating customized landing pages, consistent with embodiments of the present disclosure.

FIG. 12 illustrates an example user interface 1200 for generating customized landing pages, consistent with embodiments of the present disclosure. User interface 1200 may be presented to a user, such as user 122, on a device, such user device 120. In some embodiments, user interface 1200 may be presented after an image capture session has been completed and prior to generating landing page 830. Alternatively or additionally, user interface 1200 may be displayed after landing page 830 has been published and made accessible to user 132. For example, user interface 1200 may be used to customize or update landing page 830 that has already been made available. In some embodiments, user interface 1200 may not be presented in association with any particular image capture session or property and may be used to specify default settings for user 122. Accordingly, any future image capture sessions may automatically be used to generate landing page 830 according to the default settings or preferences selected through user interface 1200.

As shown in FIG. 12, user interface 1200 may include a preview pane 1210 for viewing landing page 830. The landing page shown in preview pane 1210 may represent the appearance of landing page 830 using the current settings and/or preferences selected or specified through other elements user interface 1200. The landing page shown in preview pane 1210 may be a preview in that it may not be viewed by another user (e.g., user 132) until it is published or made available. Accordingly, preview pane 1210 may enable user 122 to preview various changes to landing page 830 before the changes are made available to other users. In the example, shown in FIG. 12, preview pane 1210 may show an example view corresponding to view 900 and thus may include at least one image 1212. Accordingly, preview pane 1210 may pull property data 820 (including image data 822) such that the preview landing page reflects the actual information that will be displayed to a user. Alternatively or additionally, preview pane 1210 may include sample or default images and other property data. For example, this may be true when user interface 1200 is used to specify default preferences, without an association with any particular property or image capture session. In some embodiments, preview pane 1210 may be interactive to simulate the experience user 132 would have if landing page 830 were published according to the current selection of templates, settings, and preferences. For example, preview pane 1210 may include interactive elements similar to those described above with respect to FIGS. 9, 10, and 11.

In some embodiments, user interface 1200 may include a template selection pane 1220, which may allow user 122 to select a template from a plurality of templates. As used herein, a template may refer to a preset format and/or arrangement of a landing page. Accordingly, the format of a landing page does not have to be recreated each time it is used. In this example, a template 1222 may be selected, which may include multiple views 900, 1000, and 1100, as described above. Accordingly, preview pane 1210 may be displayed consistent with template 1222. As user 122 selects different templates from template pane 1220, preview pane 1210 may be updated accordingly, changing the type, layout, size, arrangement, format, color, and other aspects of property data 820 displayed in landing page 830. As indicated above, the landing page may be presented as a webpage to user 132. Accordingly, template 1222 may be a web template representing a simulated view of a webpage (i.e., landing page 830) and may be selectable via graphical interface 1200 from a plurality of web templates.

In some embodiments, user interface 1200 may include additional element for further customizing landing page 830. For example, user interface 1200 may include an options pane 1230 for specifying various types of information to be included in landing page 830. For example, this may include one or more checkboxes (e.g., checkbox 1232) for specifying which information is shown in landing page 830 on a more granular level. In some embodiments, the various categories within options pane 1230 may be expanded to show additional granularity. For example, selecting "Agent Information" may cause additional options such as "Agent Name," "Agency," "Phone Number," "Email Address," "Contact Link," etc. to be shown, allowing user 122 to select whether these types of information are shown. Preview pane 1210 may automatically update to reflect the selections made through options pane 1230. In some embodiments, this may cause various aspects of landing page 830 to be updated to include or exclude information, such as elements 902 and 904, description 906, agent detail pane 930, property details pane 1120, floorplan element 1110, or any of the various information included in landing page 830.

According to some embodiments, user interface 1200 may allow user 122 to modify various elements through preview pane 1210. For example, selecting an element (e.g., tapping, left-clicking, right-clicking, hovering over, etc.) within preview pane 1210 may cause a menu 1214 to be displayed, which may provide additional options for editing, moving, and/or removing certain elements from landing page 830. In some embodiments, this may enable user 122 to edit automatically generated content. For example, user 122 may select an option to edit description 906 to tweak or edit the language or to rewrite it altogether. Similarly, user 122 may remove photos available for viewing through image element 910, edit a price of a property shown in element 904, or the like. In some embodiments, system 100 may update preferences associated with user 122 based on the edits made through preview pane 1210. For example, if user 122 deletes a photograph of a living room (or does so more than a threshold number of times), system 100 may store or update a preference to avoid including images of living rooms in image data 822. This may also include updating preferences for image properties (e.g., clarity, color, focus, composition, etc.), order of presentation of images, features within images to be displayed, or the like. As another example, if user 122 frequently changes or deletes a sentence from description 906, system 100 may store a preference not to use the deleted snippet, or may replace a preset description with the modified version.

In some embodiments, various information included in landing page 830 may be restricted, as described above. Accordingly, user interface 1200 may enable user 122 to determine which information is behind a "login" wall or is otherwise restricted. For example, options pane 1230 may include multiple checkboxes for each item of information, one to specify whether the information is viewable in a restricted view, and another to specify whether the information is viewable at all (i.e., in an unrestricted view). For example, checkbox 1232 may specify whether agent details pane 930 is included in a publicly available version of landing page 830 (i.e., without signing in, etc.), and checkbox 1234 may specify whether agent details pane 930 is viewable behind a login wall or other restriction. In some embodiments, menu 1214 may include an option for restricting individual elements within landing page 830, as shown in FIG. 12. For example, this may enable user 122 to restrict specific images or other information. In some embodiments, system 100 may store preferences for restricting items based on interactions with user interface 1200. For example, if user 122 frequently restricts images of primary bedrooms, a preference may be stored to restrict images of primary bedrooms by default. The preferences described herein may be specific to user 122 or may apply to all users of system 100 (or various subgroupings therein). In some embodiments, user interface 1200 may include a restricted view toggle element 1216 to toggle preview pane between restricted and unrestricted views.

Once user 122 is satisfied with landing page 830, he or she may select a publish element 1240, which may be configured to cause at least one processor of system 100 to generate a webpage based on an interaction with the publish element by a user. In other words, publish element 1240 may cause the landing page shown in preview pane 1210 (and specified through the various customizations through user interface 1200) to go "live" or be made available to user 132 and other users. In some embodiments, user interface 1200 may include a save element 1242 for saving the current settings as default settings for landing pages created through system 100. Accordingly, once a future image capture session is complete, a landing page may be generated automatically based on the saved settings. Accordingly, the various information components associated with a property may automatically be placed within the page without direct user intervention.

Figure 13:
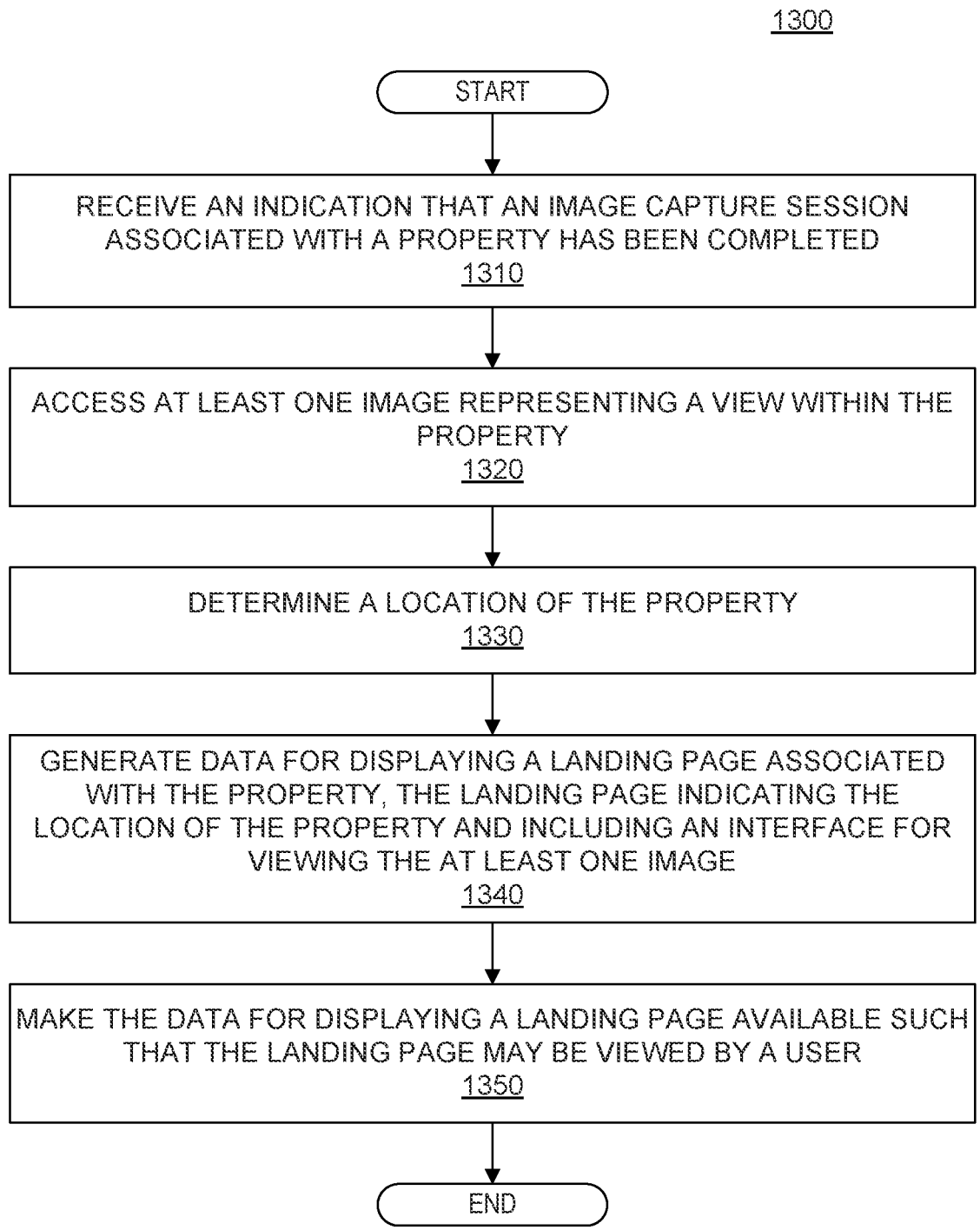
FIG. 13 is a flowchart showing an example process 1300 for automatic placement of components within a landing page without direct user intervention, consistent with embodiments of the present disclosure.

FIG. 13 is a flowchart showing an example process 1300 for automatic placement of components within a landing page without direct user intervention, consistent with embodiments of the present disclosure. In some embodiments, process 1300 may be performed by at least one processing device of a server, such as processor 210. Alternatively or additionally, some or all of process 1300 may be performed by another processing device of system 100, such as processor 310, processor 350, or processor 410. It is to be understood that throughout the present disclosure, the term "processor" is used as a shorthand for "at least one processor." In other words, a processor may include one or more structures that perform logic operations whether such structures are collocated, connected, or dispersed. In some embodiments, a non-transitory computer readable medium may contain instructions that when executed by a processor cause the processor to perform process 1300. Further, process 1300 is not necessarily limited to the steps shown in FIG. 13, and any steps or aspects of the various embodiments described throughout the present disclosure may also be included in process 1300, including those described above with respect to FIGS. 8, 9, 10, 11, and 12.

In step 1310, process 1300 may include receiving an indication that an image capture session associated with a property has been completed. For example, this may include receiving an indication that an image capture session performed by user 122 using image capture device 126 has been completed. As described above, the indication that the image capture session associated with the property has been completed may have various forms. For example, in some embodiments, the indication that the image capture session has been completed is based on a confirmation from the agent, such as an input from user 122 through image capture device 126, computing device 120, mobile device 124. As another example, the indication that the image capture session has been completed may be based on an elapsed time since the at least one image was captured or based on a distance between the location of the property and a location of the image capture device exceeding a threshold distance, as described above.

In step 1320, process 1300 may include accessing at least one image representing a view within the property. For example, this may include accessing images included in image capture session data 810. Accordingly, the at least one image may be captured by an agent using an image capture device during the image capture session.

In step 1330, process 1300 may include determining a location of the property. For example, this may include extracting location data 826, as described above. In some embodiments, the location may be determined based on properties of one or more of the at least one images. For example, the at least one image may be associated with image capture location data and the location of the property may be determined based on the location data. The geotag information recorded by the image capture device, such as GPS or other information captured by image capture device 126. In some embodiments, the geotag information may be captured using another device, such as mobile device 124.

In step 1340, process 1300 may include generating data for displaying a landing page associated with the property, such as landing page 830. For example, this may include generating property data 820, as described above. The landing page may indicate the location of the property and may include an interface for viewing the at least one image. For example, landing page 830 may include a location element 902 and an image element 910, as described above. The landing page may include various other information, such as price for purchase of the property, a property description, a square footage of the property, a number of rooms included in the property, or various other information described herein. In some embodiments, the data for displaying the landing page may be generated independent of a request from the agent. In other words, property data 820 and/or landing page 830 may be generated automatically based on the indication that the image capture session is complete and without direct intervention from user 122. According to some embodiments, the data for displaying the landing page may be generated according to a template defining an appearance of the landing page. For example, landing page 830 may be generated according to template 1222, as described above. In some embodiments, the template may be selected by the agent from a plurality of templates. For example, template 1222 may be selected using template selection pane 1220.

In step 1350, process 1300 may include making the data for displaying a landing page available such that the landing page may be viewed by a user. For example, this may include making property data 820 available and/or generating landing page 830 as described above. Accordingly property data 820 may be made available to user 122, for example, though a web interface accessible by computing device 130.

In some embodiments, the landing page may further include content generated by system 100. Accordingly, process 1300 may further include generating at least one content item based on the at least one image. For example, the at least one content item may include a floorplan representing a layout of the property or a virtual tour of the property, as described above. The landing page may further include an interface for viewing the at least one content item, such as floorplan element 1110 and/or viewing pane 1010. In some embodiments, the content item may include various other forms of information that may be extracted or generated based on one or more images. For example, the at least one content item may include a number of bedrooms included in the property, a number of bathrooms included in the property, a size of a garage included in the property, an attribute of a neighborhood the property is included in, a tax amount, a number of levels included in the property, an attribute of a yard associated with the property, an interior fixture attribute, or the like.

In some embodiments, the various information displayed in the landing page may be modified or customized by the agent (i.e., user 122). Accordingly, process 1300 may further include receiving an indication of a customization request from the agent and updating the data for displaying a landing page based on the customization request. As described above, the data for displaying the landing page may be generated according to a template defining an appearance of the landing page. Accordingly, the customization request may include a selection of a different template.

According to some embodiments, at least some of the data accessible through the landing page may be restricted. For example, the at least one image may include a first image and a second image. Process 1300 may include allowing the user to view the first image without entering login information and restricting the user from viewing the second image until the login information is entered. In some embodiments, the second image may be identified as restricted automatically. For example, process 1300 may include analyzing the second image to identify at least one feature represented in the second image; and determining that the user is to be restricted from viewing the second image until the login information is entered based on the identified at least one feature. The same or similar restrictions may be applied to other content, such as content having a certain category (e.g., agent information), or specific items of information, as described above. In some embodiments, the content to be restricted may be specified by user 122 through user interface 1200. While login information is used by way of example, various other forms of information may be required to access the restricted content.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer-readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A non-transitory computer readable medium including instructions that, when executed by at least one processor, cause the at least one processor to perform operations for automatic placement of components within a landing page without direct user intervention, the operations comprising:
receiving an indication that an image capture session associated with a property has been completed;
accessing a plurality of images representing a view within a building on the property, the plurality of images being captured by an agent using an image capture device during the image capture session;
selecting, based on an analysis of the plurality of images using a trained machine learning model, a subset of the plurality of images to present to a user, the subset of images being selected based on one or more features represented in the subset of the plurality of images, wherein, for a particular feature of the one or more features, selecting an image associated with the particular feature to include in the subset of the plurality of images includes:
identifying, among the plurality of images, a plurality of candidate images including the particular feature using the trained machine learning model,
rating the plurality of candidate images including the particular feature, and
selecting the image associated with the particular feature from the plurality of candidate images based on the rating;
determining a location of the property;
generating data for displaying a landing page associated with the property, the landing page indicating the location of the property and including an interface for viewing the subset of the plurality of images, the data for displaying the landing page being generated independent of a request from the agent; and
making the data for displaying the landing page available such that the landing page may be viewed by the user.

2. The non-transitory computer readable medium of claim 1, wherein the indication that the image capture session has been completed is based on a confirmation from the agent.

3. The non-transitory computer readable medium of claim 1, wherein the indication that the image capture session has been completed is based on an elapsed time since the at least one image was captured.

4. The non-transitory computer readable medium of claim 1, wherein the indication that the image capture session has been completed is based on a distance between the location of the property and a location of the image capture device exceeding a threshold distance.

5. The non-transitory computer readable medium of claim 1, wherein the data for displaying the landing page is generated according to a template defining an appearance of the landing page.

6. The non-transitory computer readable medium of claim 5, wherein the template is selected by the agent from a plurality of templates.

7. The non-transitory computer readable medium of claim 1, wherein the landing page further indicates at least one of a price for purchase of the property, a property description, a square footage of the property, or a number of rooms included in the property.

8. The non-transitory computer readable medium of claim 1, wherein the plurality of images are associated with image capture location data and wherein the location of the property is determined based on the location data.

9. The non-transitory computer readable medium of claim 8, wherein the image capture location data includes geotag information recorded by the image capture device.

10. The non-transitory computer readable medium of claim 1, wherein the operations further comprise generating at least one content item based on the plurality of images and wherein the landing page further includes an interface for viewing the at least one content item.

11. The non-transitory computer readable medium of claim 10, wherein the at least one content item includes a floorplan representing a layout of the property.

12. The non-transitory computer readable medium of claim 10, wherein the at least one content item includes a virtual tour of the property.

13. The non-transitory computer readable medium of claim 10, wherein the at least one content item includes an indication of at least one of: a number of bedrooms included in the property, a number of bathrooms included in the property, a size of a garage included in the property, an attribute of a neighborhood the property is included in, a tax amount, a number of levels included in the property, an attribute of a yard associated with the property, or an interior fixture attribute.

14. The non-transitory computer readable medium of claim 1, wherein the operations further comprise:
receiving an indication of a customization request from the agent; and
updating the data for displaying a landing page based on the customization request.

15. The non-transitory computer readable medium of claim 14, wherein the data for displaying the landing page is generated according to a template defining an appearance of the landing page and wherein the customization request includes a selection of a different template.

16. The non-transitory computer readable medium of claim 1, wherein the plurality of images include a first image and a second image and wherein the interface for viewing the at least one image is configured to:
allow the user to view the first image without entering login information; and
restrict the user from viewing the second image until the login information is entered.

17. The non-transitory computer readable medium of claim 16, wherein the operations further include:
analyzing the second image to identify at least one feature represented in the second image; and
determining that the user is to be restricted from viewing the second image until the login information is entered based on the identified at least one feature.

18. A system for automatic placement of components within a landing page without direct user intervention, the system comprising:
at least one processor configured to:
receive an indication that an image capture session associated with a property has been completed;
access a plurality of images representing a view within a building on the property, the plurality of images being captured by an agent using an image capture device during the image capture session;

select, based on an analysis of the plurality of images using a trained machine learning model, a subset of the plurality of images to present to a user, the subset of images being selected based on one or more features represented in the subset of the plurality of images, wherein, for a particular feature of the one or more features, selecting an image associated with the particular feature to include in the subset of the plurality of images includes:
  identifying, among the plurality of images, a plurality of candidate images including the particular feature using the trained machine learning model,
  rating the plurality of candidate images including the particular feature, and
  selecting the image associated with the particular feature from the plurality of candidate images based on the rating;
determine a location of the property;
generate data for displaying a landing page associated with the property, the landing page indicating the location of the property and including an interface for viewing the subset of the plurality of images, the data for displaying the landing page being generated independent of a request from the agent; and
make the data for displaying the landing page available such that the landing page may be viewed by the user.

19. A computer-implemented method for automatic placement of components within a landing page without direct user intervention, the method comprising:
  receiving an indication that an image capture session associated with a property has been completed;
  accessing a plurality of images representing a view within a building on the property, the being captured by an agent using an image capture device during the image capture session;
  selecting, based on an analysis of the plurality of images using a trained machine learning model, a subset of the plurality of images to present to a user, the subset of images being selected based on one or more features represented in the subset of the plurality of images, wherein, for a particular feature of the one or more features, selecting an image associated with the particular feature to include in the subset of the plurality of images includes:
    identifying, among the plurality of images, a plurality of candidate images including the particular feature using the trained machine learning model,
    rating the plurality of candidate images including the particular feature, and
    selecting the image associated with the particular feature from the plurality of candidate images based on the rating;
  determining a location of the property;
  generating data for displaying a landing page associated with the property, the landing page indicating the location of the property and including an interface for viewing the subset of the plurality of images, the data for displaying the landing page being generated independent of a request from the agent; and
  making the data for displaying the landing page available such that the landing page may be viewed by the user.

* * * * *